United States Patent
Aleem et al.

(10) Patent No.: US 11,971,246 B2
(45) Date of Patent: Apr. 30, 2024

(54) IMAGE-BASED FITTING OF A WEARABLE COMPUTING DEVICE

(71) Applicant: GOOGLE LLC, Mountain View, CA (US)

(72) Inventors: Idris Syed Aleem, Kitchener (CA); Rees Anwyl Samuel Simmons, Waterloo (CA); Ahmed Gawish, Waterloo (CA)

(73) Assignee: GOOGLE LLC, Mountain View, CA (US)

( * ) Notice: Subject to any disclaimer, the term of this patent is extended or adjusted under 35 U.S.C. 154(b) by 94 days.

(21) Appl. No.: 17/305,834

(22) Filed: Jul. 15, 2021

(65) Prior Publication Data
US 2023/0020652 A1 Jan. 19, 2023

(51) Int. Cl.
| | | |
|---|---|---|
| G01B 11/02 | (2006.01) | |
| G02B 27/01 | (2006.01) | |
| G06T 17/10 | (2006.01) | |
| G06V 40/16 | (2022.01) | |

(52) U.S. Cl.
CPC ........ G01B 11/022 (2013.01); G02B 27/0149 (2013.01); G06T 17/10 (2013.01); G06V 40/161 (2022.01); G06V 40/171 (2022.01); G02B 2027/0154 (2013.01)

(58) Field of Classification Search
CPC ............................. G02C 13/005; G02C 13/003
See application file for complete search history.

(56) References Cited

U.S. PATENT DOCUMENTS

| | | | | |
|---|---|---|---|---|
| 2013/0262259 A1* | 10/2013 | Xie | ........................ | G02C 7/086 351/204 |
| 2013/0322683 A1 | 12/2013 | Jacobs | | |
| 2015/0055086 A1* | 2/2015 | Fonte | ...................... | G06T 19/20 700/98 |

(Continued)

FOREIGN PATENT DOCUMENTS

| | | |
|---|---|---|
| CN | 107992835 A | 5/2018 |
| CN | 111241925 A | 6/2020 |
| EP | 3339943 A1 | 6/2018 |

OTHER PUBLICATIONS

Agarwal, et al., "Facial Key Points Detection Using Deep Convolutional Neural Network—Naimishnet", arXiv:1710.00977v1;, Oct. 3, 2017, 7 pages.

(Continued)

*Primary Examiner* — Clifford Hilaire
(74) *Attorney, Agent, or Firm* — Brake Hughes Bellermann LLP

(57) ABSTRACT

A system and method are provided for sizing and fitting a head mounted wearable computing device for a user based on image data of the head of the user, including a known reference device having a known scale. The system and method may include capturing image data including a face of the user to be fitted for the head mounted wearable computing device. The known reference device having the known scale is compared to features detected in the image data to determine a scaling factor. The scaling factor is used to size, or assign measures to facial features detected in the image data. A three-dimensional model of the head of the user may be generated from the captured image data.

15 Claims, 18 Drawing Sheets

(56) References Cited

U.S. PATENT DOCUMENTS

| | | | |
|---|---|---|---|
| 2016/0124249 A1* | 5/2016 | Haddadi | A61B 3/0025 |
| | | | 351/204 |
| 2019/0146246 A1 | 5/2019 | Fonte et al. | |
| 2019/0155060 A1* | 5/2019 | Barton | A61B 3/0033 |
| 2020/0103675 A1 | 4/2020 | Schwarz et al. | |
| 2022/0057658 A1* | 2/2022 | Briggs | G06F 30/20 |

OTHER PUBLICATIONS

International Search Report and Written Opinion for PCT/US2022/073642, dated Nov. 7, 2022, 11 pages.

\* cited by examiner

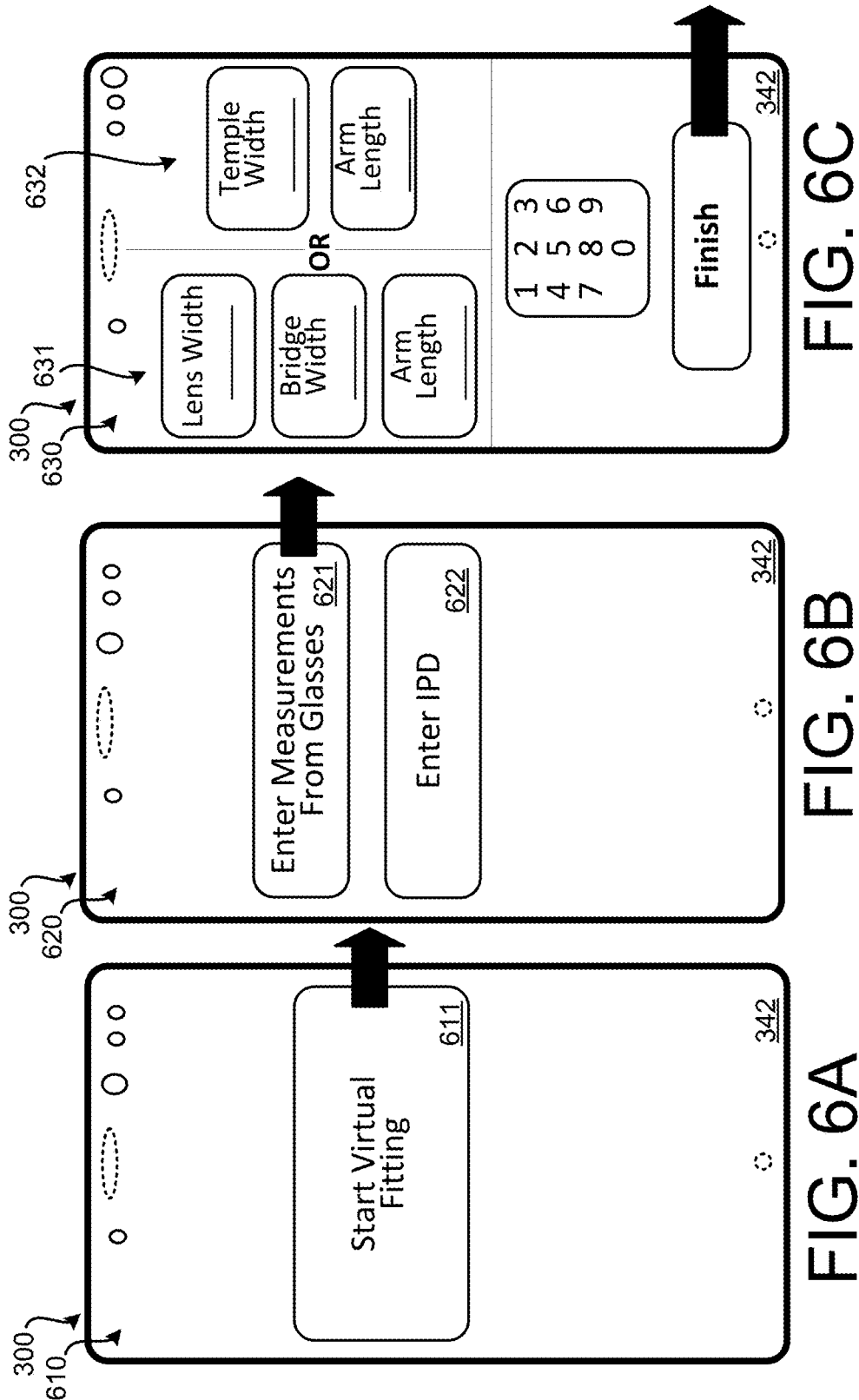

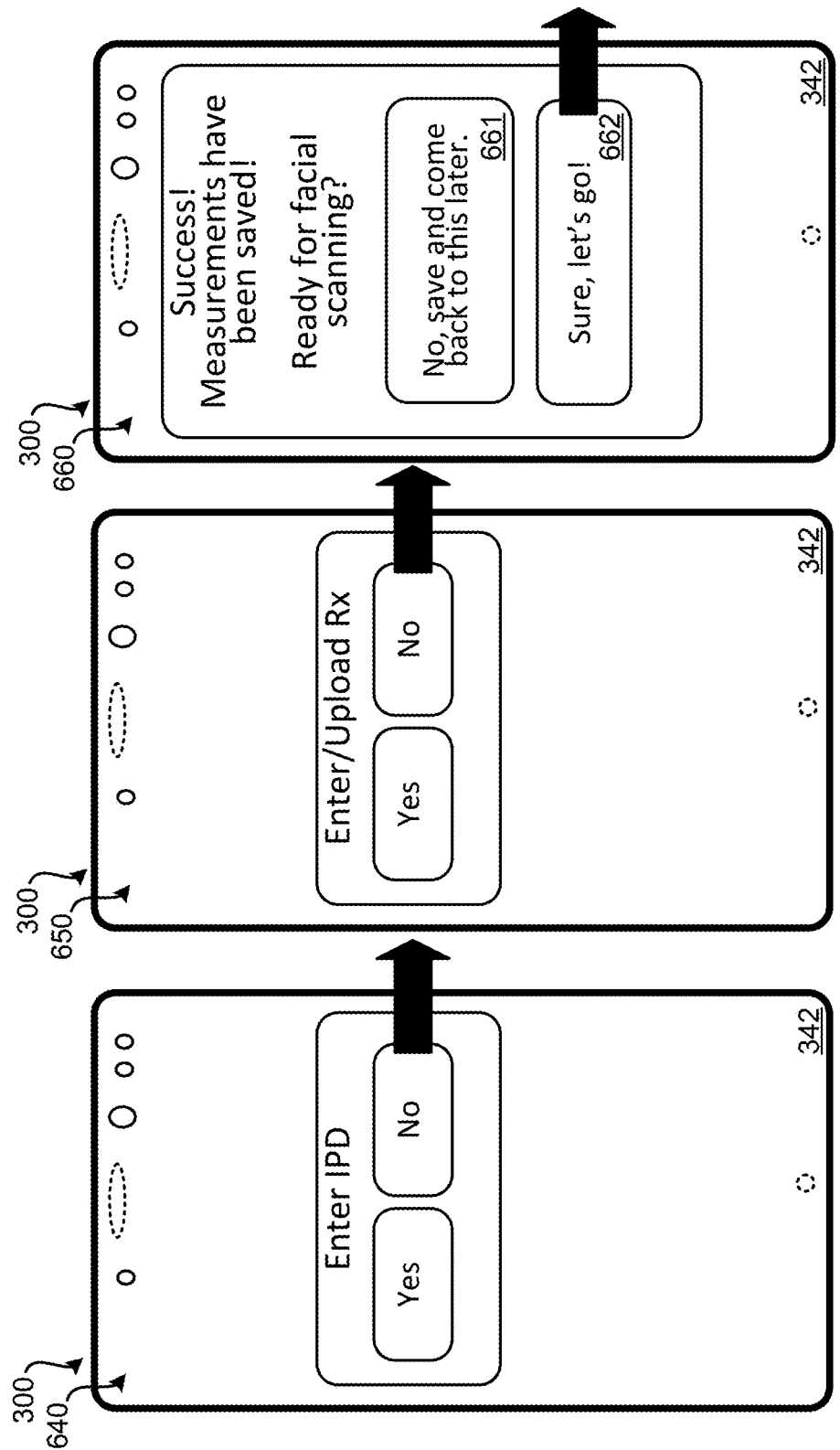

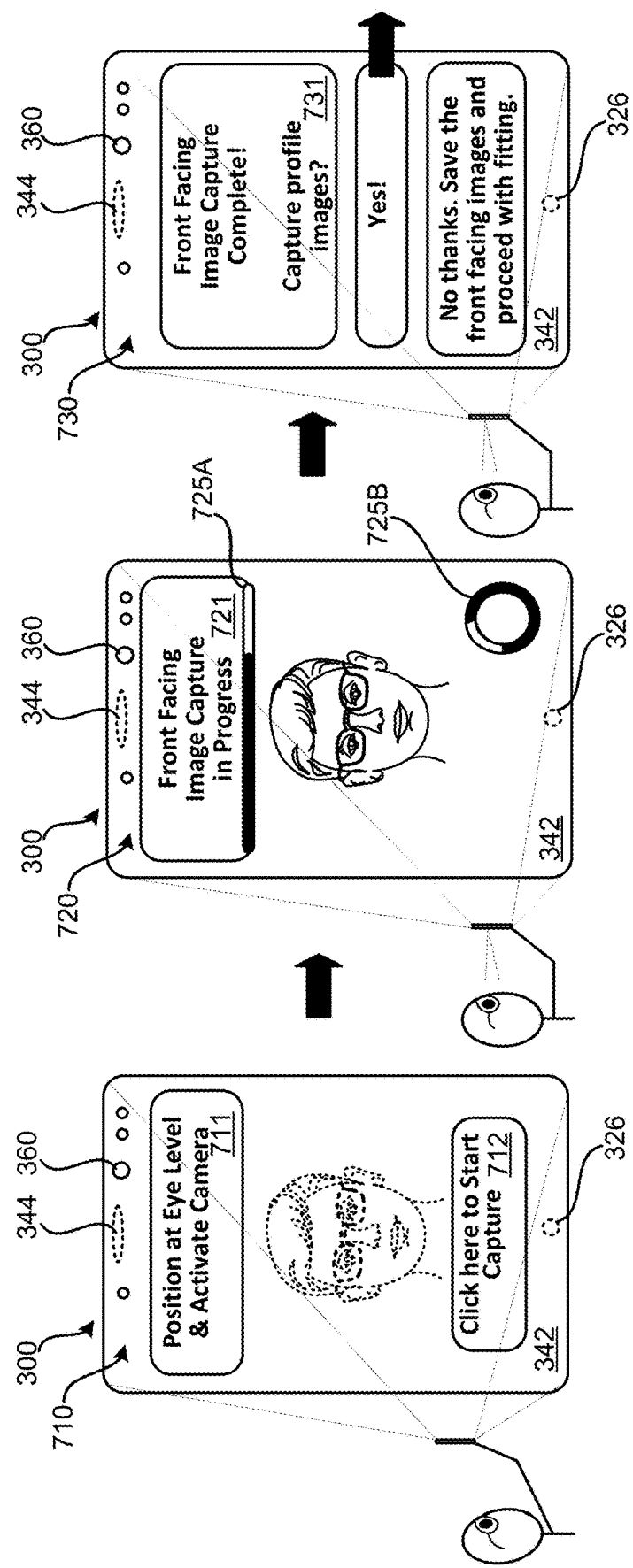

IMAGE-BASED FITTING OF A WEARABLE COMPUTING DEVICE

TECHNICAL FIELD

This description relates in general to fitting of a wearable device from image data, and in particular, to the fitting of a wearable device based on the detection of a known reference device having a known scale in the image data.

BACKGROUND

Wearable devices may include head worn devices including, for example, smart glasses, headsets, ear buds and the like, wrist and/or hand worn devices such as smart watches, smart bracelets, smart rings and the like, smart pendants, fitness trackers, cameras, body sensors, and other such devices. In some examples, a user may want to select and/or customize a wearable device for fit and/or function. For example, a user may wish to select and/or customize a pair of smart glasses to include selection of frames, incorporation of prescription lenses, and other such features. Existing systems for procurement of these types of wearable devices do not provide for accurate fitting and customization, particularly without access to a retail establishment.

SUMMARY

In one general aspect, a computer-implemented method of fitting a head mounted wearable computing device including a display device includes receiving, via an application executing on a computing device, at least one measurement associated with a known reference device; receiving, via the application, image data captured by the computing device, the image data including a head of a user and the known reference device; detecting the known reference device in the received image data; associating a scale with the known reference device within the image data; detecting a plurality of features of the head of the user in the received image data; determining a respective plurality of measurements for the detected plurality of features of the head of the user based on the scale associated with the known reference device within the image data; producing a three-dimensional model of the head of the user based on the plurality of measurements of the plurality of features of the head of the user, the plurality of measurements of the plurality of features of the head being based on the scale associated with the known reference device; and receiving, from a simulation engine, a configuration of the head mounted wearable computing device for the user based on the three-dimensional model of the head of the user.

In some implementations, the known reference device is a wearable device including at least one known physical feature. Receiving the at least one measurement associated with the known reference device may include detecting the at least one known physical feature in the image data captured by the computing device; and associating a known measurement with the detected at least one known physical feature.

In some implementations, the known reference device is a wearable device worn by the user in the image data captured by the computing device. Receiving the at least one measurement associated with the known reference device may include receiving a first measurement corresponding to a width of a lens portion of a frame of the wearable device; receiving a second measurement corresponding to a width of a bridge portion of the frame, wherein a frontal width measurement of the frame is equal to two times the first measurement plus the second measurement; and receiving a third measurement corresponding to a length of a temple arm portion of the frame. Detecting the known reference device in the received image data and associating the scale with the known reference device within the image data may include detecting, within the image data, a first hinge area at which a first rim portion and a first temple arm portion of the frame are coupled; detecting, within the image data, a second hinge area at which a second rim portion and a second temple arm portion of the frame are coupled; comparing a distance in the image data between the first hinge area and the second hinge area with the known frontal width measurement; and determining a scaling factor based on the comparing.

In some implementations, detecting the known reference device in the received image data and associating the scale with the known reference device within the image data includes detecting at least one feature of the known reference device in the image data; associating a known measurement with the detected at least one feature; comparing the known measurement associated with the detected at least one feature to a detected size within the image of the detected at least one feature; and determining a scaling factor based on the comparing. Producing the three-dimensional model may include applying the scaling factor to the detected plurality of features of the head of the user.

In some implementations, the known reference device is a pair of glasses worn by the user, and receiving the at least one measurement associated with the known reference device includes receiving a frontal width measurement of a frame of the pair of glasses; and receiving a temple arm measurement of the frame of the pair of glasses.

In some implementations, receiving image data captured by the computing device includes receiving image data including front facing images of the head of the user and the known reference device, and profile images of the head of the user and the known reference device. In some implementations, producing the three-dimensional model of the head of the user includes one of: producing the three-dimensional model of the head of the user by a processor of the computing device; or transmitting, by the computing device, the image data to an external computing device, and receiving, by the computing device, the three-dimensional model of the head of the user from the external computing device.

In some implementations, the method also includes detecting a plurality of optical measurements in the received image data, the plurality of optical measurements including at least one of pupil height, interpupillary distance, left pupil distance, right pupil distance, vertex distance or pantoscopic angle. In some implementations, the application executing on the computing device invokes a self-portrait mode of operation and initiates operation of a forward facing camera of the computing device operated by the user.

In another general aspect, a non-transitory computer-readable medium stores executable instructions that when executed by at least one processor of a computing device are configured to cause the at least one processor to receive, via an application executing on the computing device, at least one measurement associated with a known reference device; receive image data captured by a camera of the computing device, the image data including image data representing a head of a user and image data representing the known reference device; detect the known reference device in the received image data; associate a scale with the known reference device within the image data; detect a plurality of features of the head of the user in the received image data; determine a respective plurality of measurements for the detected plurality of features of the head of the user based on the scale associated with the known reference device within the image data; produce a three-dimensional model of the head of the user based on the plurality of measurements of the plurality of features of the head of the user determined based on the scale associated with the known reference device; and output a configuration of the head mounted wearable computing device for the user based on the three-dimensional model of the head of the user.

In some implementations, the known reference device is a wearable device including at least one known physical feature, and the instructions cause the at least one processor to receive the at least one measurement, including detect the at least one known physical feature in the image data captured by the computing device; and associate a known measurement with the detected at least one known physical feature. The instructions may cause the at least one processor to detect the known reference device in the received image data and associate the scale with the known reference device within the image data, including detect at least one feature of the known reference device in the image data; associate a known measurement with the detected at least one feature; compare the known measurement associated with the detected at least one feature to a detected size within the image of the detected at least one feature; and determine a scaling factor based on the comparing.

In some implementations, the known reference device is a wearable device worn by the user in the image data captured by the computing device, and the instructions cause the at least one processor to receive the at least one measurement associated with the known reference device, including receive a first measurement corresponding to a width of a lens portion of a frame of the wearable device worn by the user in the image data; receive a second measurement corresponding to a width of a bridge portion of the frame; and receiving a third measurement corresponding to a length of a temple arm portion of the frame. The instructions may cause the at least one processor to produce the three-dimensional model, including apply the determined scaling factor to the detected plurality of features of the head of the user.

In some implementations, the instructions cause the at least one processor to detect a plurality of optical measurements in the received image data, the plurality of optical measurements including at least one of pupil height, interpupillary distance, left pupil distance, right pupil distance, vertex distance or pantoscopic angle.

In another general aspect, a computer-implemented method of fitting a head mounted wearable computing device including a display device includes receiving, via an application executing on a computing device, image data captured by the computing device, the image data including a head of a user; receiving, via the application, a known interpupillary distance measurement of the user; detecting, in the image data captured by the computing device, a position of a first pupil of the user and a second pupil of the user; associating a scale with the known reference device within the image data; determining a scaling factor based on the received interpupillary distance and a distance between the detected position of the first pupil and the detected position of the second pupil in the image data; detecting a plurality of features of the head of the user in the received image data; determining a respective plurality of measurements for the detected plurality of features of the head of the user based on the determined scale; producing a three-dimensional model of the head of the user based on the plurality of measurements of the plurality of features of the head of the user, the plurality of measurements of the plurality of features of the head being based on the scaling factor associated with the known interpupillary distance and the distance between the first and second pupils detected in the image data; and receiving, from a simulation engine, a configuration of the head mounted wearable computing device for the user based on the three-dimensional model of the head of the user.

In some implementations, producing the three-dimensional model includes applying the scaling factor to the detected plurality of features of the head of the user. In some implementations, the method also includes detecting a plurality of optical measurements in the received image data, the plurality of optical measurements including at least one of pupil height, interpupillary distance, left pupil distance, right pupil distance, vertex distance or pantoscopic angle; and applying the scaling factor to the detected plurality of optical measurements.

The details of one or more implementations are set forth in the accompanying drawings and the description below. Other features will be apparent from the description and drawings, and from the claims.

BRIEF DESCRIPTION OF THE DRAWINGS

FIGS. 6A-6F illustrate an example process for providing information related to a known reference device, in accordance with implementations described herein.

FIGS. 7A-7J illustrate an example process for capturing image data, in accordance with implementations described herein.

DETAILED DESCRIPTION

Figure 1A:
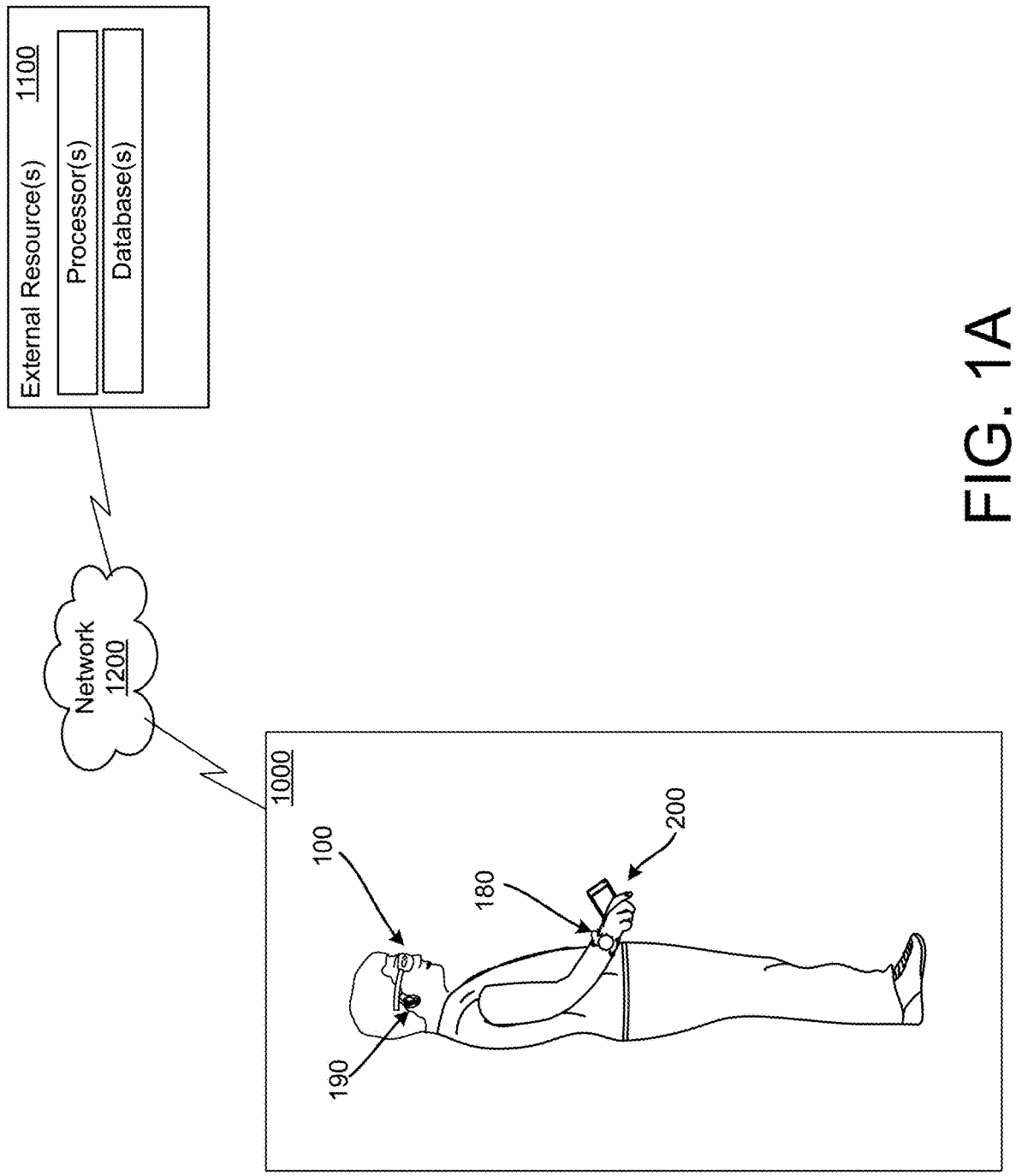
FIG. 1A illustrates an example system, in accordance with implementations described herein.

This disclosure relates to systems and methods for selection and fitting of a wearable computing device, including the determination of wearable fit parameters, display fit parameters and ophthalmic fit parameters associated with the wearable computing device. Systems and methods, in accordance with implementations described herein provide for the determination of wearable fit and/or display fit and/or ophthalmic fit using a known reference object or device having a known measure or scale to be used in generating an accurate three-dimensional model of the user. Systems and methods, in accordance with implementations described herein, provide for the detection of measurements of physical attributes of a user from image data captured via an application running on a computing device operated by the user. Systems and methods, in accordance with implementations described herein, use the known reference object or device having the known measure or scale, detected within the image data, to derive the measurements associated with the physical attributes of the user. The use of the known reference object or device having the known measure or scale to derive the measurements of the physical attributes may yield measurements having improved accuracy, thus improving the determined wearable fit and/or display fit and/or ophthalmic fit. The use of the known reference object or device having the known measure or scale may facilitate the capture and detection of these measurements by the user in a self-directed, or unsupervised, or unproctored manner. Systems and methods, in accordance with implementations described herein, provide for the generation of the three-dimensional model of the user, for example, the head of the user, based on the detected physical attributes and associated measurements.

In some examples, systems and methods as described herein may provide for the collection of wearable fit measurements and/or display fit measurements and/or ophthalmic fit measurements from image capture data, for wearable computing devices in the form of smart glasses that include a display device. In some examples, the wearable computing device in the form of smart glasses include corrective/prescription lenses that are customized for the particular physical attributes, needs and preferences of the user. In some implementations, the known reference device providing the known scale may be a personal pair of glasses providing known scalable measures in an image of the user wearing the personal pair of glasses. In some implementations, the known reference device providing the known scale may be a known ophthalmic measurement such as interpupillary distance, provided by the user, for processing together with the captured image(s). In some implementations, the known reference device having the known scale may be numerous other types of devices having an associated known size or scale, and can be included in captured images of the user. Systems and methods, in accordance with implementations described herein, provide for the capture of image data through an application running on a computing device operated by the user, in a self-directed, or unsupervised manner, and without the need for a proctor or agent overseeing the capture of image data for the determination of these measurements and the generation of the three-dimensional model. The collection of measurement data in this manner may yield relatively accurate measurement data, and may allow a wearable computing device, such as, for example, smart glasses and other such wearable computing devices, to be customized for the specific needs, preferences and functionality associated with a particular user, without the need to access a physical retail establishment.

Hereinafter, systems and methods, in accordance with implementations described herein, will be described with respect to the selection and fitting of a wearable computing device in the form of a head mounted display device, such as, for example, smart glasses including a display device. In such a head mounted display device, content displayed by the display device may be viewable by/visible to a user wearing the wearable computing device. Hereinafter, systems and methods, in accordance with implementations described herein, will be described with respect to the detection of measurements for selection and fitting of the wearable computing device based on the detection of a known reference object or device having a known scale, for example metric scale, within the image capture data collected via the application running on the computing device operated by the user. In a situation in which the user would benefit from a wearable computing device including corrective lenses, these systems and methods may provide for the collection of ophthalmic fit measurements. The determination of ophthalmic fit for the user, based on the ophthalmic fit measurements, may allow for the incorporation of corrective/prescription lenses into the wearable computing device. The determination of ophthalmic fit for the user based on the ophthalmic fit measurements may allow the features of the corrective/prescription lenses to be taken into account in configuring the display device for the wearable computing device. That is, systems and methods, in accordance with implementations described herein, may detect wearable fit measurements and/or display fit measurements and/or ophthalmic fit measurements using a known reference object and an image based capture system and method to provide for the selection of frames of the wearable computing device, for the fitting of a display device into the wearable computing device, and for the incorporation of corrective/prescription lenses into the wearable computing device such that content displayed by the display device is visible to the user wearing the wearable computing device.

FIG. 1A illustrates a system in which a user may operate one or more mobile computing devices, and can access one or more external resources 1100 via a network 1200. FIG. 1A provides a third person view of the user in an ambient environment 1000, including various examples of mobile computing devices. In the example shown in FIG. 1A, the example mobile computing devices include a first head worn wearable computing device 100, a second head worn wearable computing device 190, a wrist worn computing device 180, and a handheld computing device 200. In some examples, the first head worn wearable computing device 100 can include various components including for example a display, a camera that can capture images of the ambient environment, audio input/output capability, user input capability and the like, such as in a head mounted display device, in the form of smart glasses, or a headset. In some examples, the second head worn computing device 190 can be an ear worn computing device such as headphones, or earbuds, and can include audio input/output capability, a camera that can capture images of the ambient environment, user input capability and the like. In some examples, the wrist worn computing device 180 can include a display, a camera that can capture images of the ambient environment, audio input/output capability, user input capability and the like, such as in a smart watch, or wristband. In some examples, the handheld computing device 200 can include a display, a camera that can capture images of the ambient environment, audio input/output capability, user input capability, and the like, such as in a smartphone. FIG. 1A illustrates just some examples of mobile computing devices. The principles to be described herein may be applied to other types of mobile computing devices not specifically shown in FIG. 1A. In some examples, the mobile computing devices, including the example computing devices shown in FIG. 1A, can communicate with each other and/or with the external resources 1100, to exchange information, to receive and transmit input and/or output, and the like.

Figure 1B:
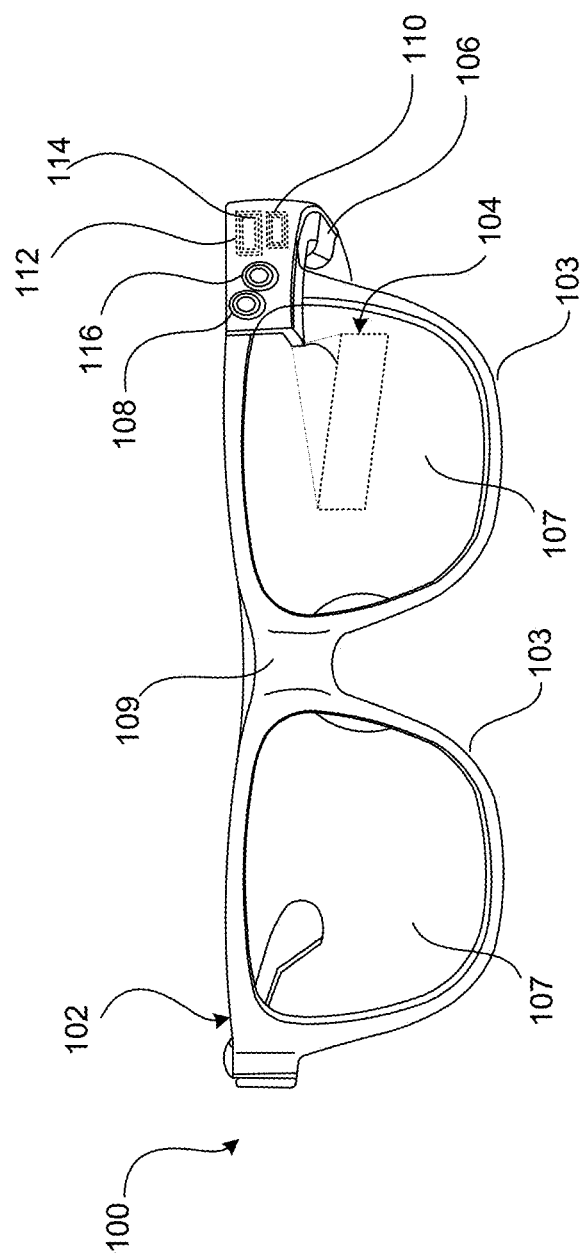
FIG. 1B is a front view.
Figure 1C:
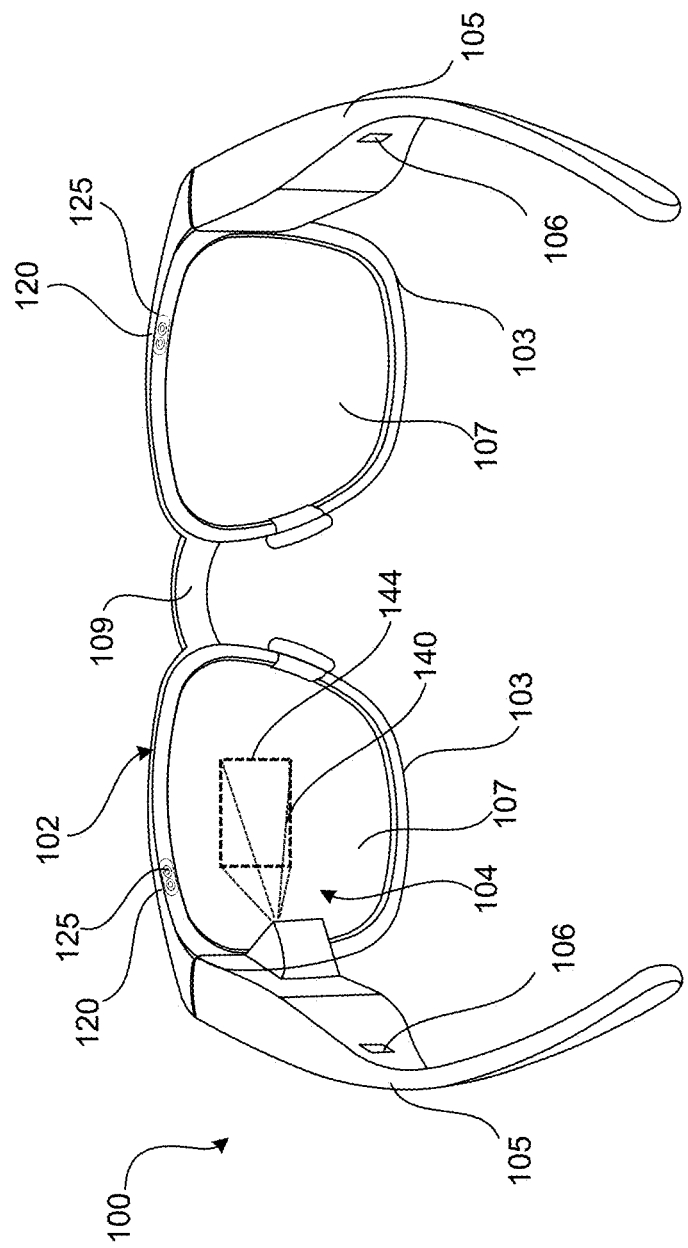
FIG. 1C is a rear view, of an example wearable computing device shown in FIG. 1A, in accordance with implementations described herein.

FIG. 1B is a front view, and FIG. 1C is a rear view, of the example wearable computing device 100 shown in FIG. 1A, in the form of a pair of smart glasses, or augmented reality glasses. Hereinafter, systems and methods in accordance with implementations described herein will be described with respect to the wearable computing device 100 in the form of smart glasses, simply for ease of discussion and illustration. The principles to be described herein can be applied to other types of wearable computing devices and/or combinations of mobile/wearable computing devices working together.

As shown in FIG. 1B, the example wearable computing device 100 includes a frame 102. In the example shown in FIGS. 1B and 1C, the frame 102 includes rim portions 103 surrounding glass portion(s), or lenses 107, and arm portions 105 coupled to a respective rim portion 103. In some examples, the lenses 107 may be corrective/prescription lenses. In some examples, the lenses 107 may be glass portions that do not necessarily incorporate corrective/prescription parameters. In some examples, a bridge portion 109 connects the rim portions 103 of the frame 102. A display device 104 may be coupled in or to a portion of the frame 102. In the example shown in FIGS. 1A and 1B, the display device 104 is coupled in the arm portion 105 of the frame 102. In the example shown in FIGS. 1A and 1B, the display device 104 is coupled in one of the two arm portions 105 of the frame 102. In some examples, a display device 104 is coupled in each of the two arm portions 105 of the frame 102. An eye box 140 extends toward the lens(es) 107, for output of content at an output coupler 144 at which content, output by the display device 104, may be visible to the user. In some examples, the output coupler 144 may be substantially coincident with the lens(es) 107.

In some implementations, the display device 104 may include a see-through near-eye display. For example, the display device 104 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 107, next to content (for example, digital images, user interface elements, virtual content, and the like) generated by the display device 104. In some implementations, waveguide optics may be used to depict content on the display device 104.

The wearable computing device 100 can also include an audio output device 106 (such as, for example, one or more speakers), an illumination device 108, a sensing system 110, a control system 112, at least one processor 114, and an outward facing image sensor 116, or camera 116. In some implementations, the wearable computing device 100 can include a gaze tracking device 120 including, for example, one or more sensors 125, to detect and track eye gaze direction and movement. Data captured by the sensor(s) 125 may be processed to detect and track gaze direction and movement as a user input. In some implementations, the sensing system 110 may include various sensing devices and the control system 112 may include various control system devices including, for example, one or more processors 114 operably coupled to the components of the control system 112. In some implementations, the control system 112 may include a communication module providing for communication and exchange of information between the wearable computing device 100 and other external devices.

Numerous different sizing and fitting measurements and/or parameters may be taken into account when sizing and fitting the wearable computing device 100, such as the example smart glasses shown in FIGS. 1A-1C, for a particular user. This may include, for example, wearable fit parameters, or wearable fit measurements. Wearable fit parameters/measurements may take into account how a particular frame 102 fits and/or looks and/or feels on a particular user. Wearable fit parameters/measurements may take into consideration numerous factors such as, for example, whether the frame 102 is wide enough to be comfortable with respect to the temples yet also not so wide that the frame 102 cannot remain relatively stationary when worn by the user (i.e., too big, or too wide). Wearable fit parameters/measurements may take into consideration other factors such as whether the rim portions 103 and bridge portion 109 are sized so that the bridge portion 109 can rest comfortably on the bridge of the user's nose, whether the arm portions 105 are sized to comfortably rest on the user's ears, and other such comfort related considerations. Wearable fit parameters/measurements may take into account as-worn considerations including how the user naturally wears the frame 102, such as, for example, head posture/how the user naturally holds his/her head, how the user positions the frame relative to his/her face, and the like. Wearable fit parameters/measurements may take into account whether the size and/or shape and/or contour of the frame 102 is aesthetically pleasing to the user, and is compatible with the user's facial features. In some examples, wearable fit parameters/measurements may take into account whether a fit associated with a particular frame configuration can accommodate incorporation of a display device such that a display area can be coordinated with the natural field of view of the user. In some examples, wearable fit parameters may take into account whether an eye tracking camera arrangement associated with a particular frame configuration can effectively track user eye gaze and movement.

Display fit parameters, or display fit measurements may be taken into account when sizing and fitting the wearable computing device 100 for a particular user. Display fit parameters/measurements may be used to configure the display device 104 for a set of frames 102 for a particular user, so that content displayed by the display device 104 is visible to the user. For example, display fit parameters/measurements may provide an indication of placement of the display device 104 so that content displayed by the display device 104 is captured within at least a set portion of the field of view of the user. For example, the display fit parameters/measurements may be used to configure the display device 104 to provide at least a set level of gazability, corresponding to an amount, or portion, or percentage of the display of content that is visible to the user at a set brightness level and a set pupil size at a periphery (for example, a least visible corner) of the field of view of the user. The display fit parameters/measurements may be used to configure the display device 104 to provide the best possible placement of the display of content to the user for a particular set of frames 102.

Figure 2A:
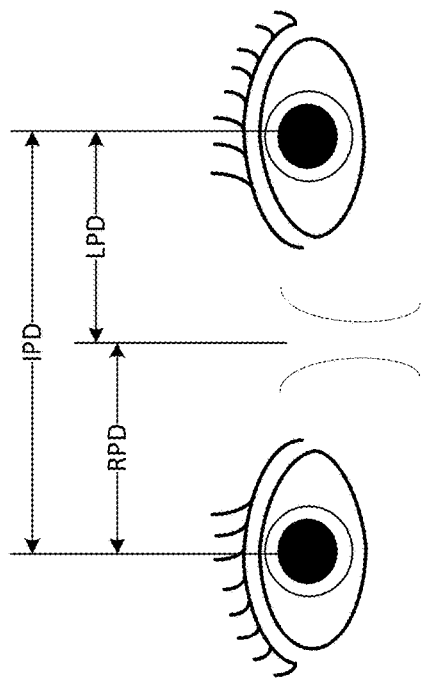
FIGS. 2A-2D illustrate example ophthalmic measurements.
Figure 2B:
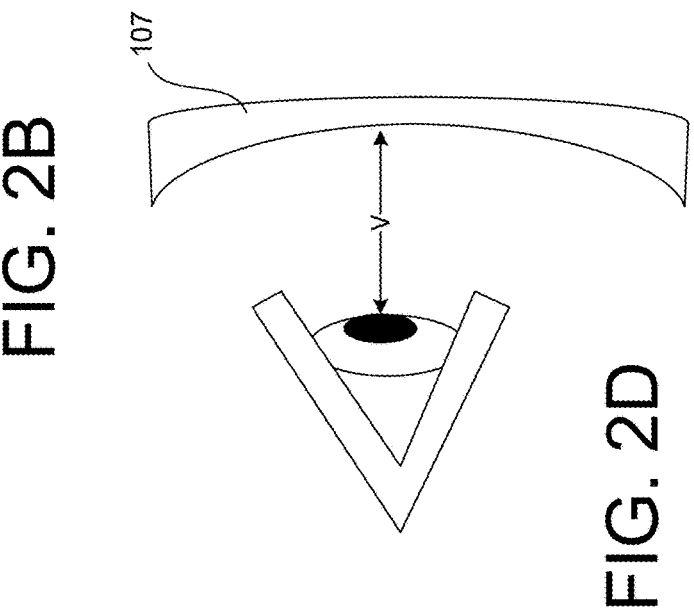
Figure 2C:
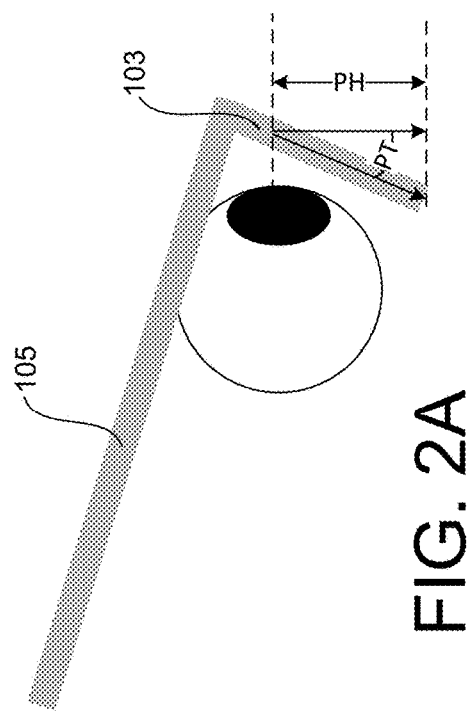
Figure 2D:
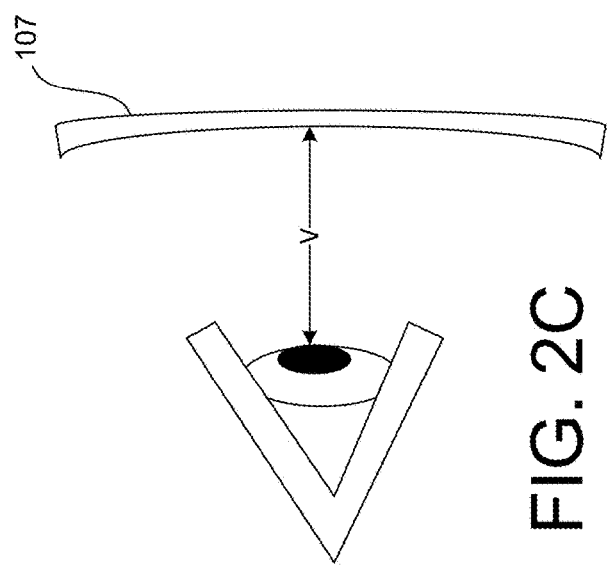

In some examples, ophthalmic fit parameters, or ophthalmic fit measurements may be taken into account when sizing and fitting the wearable computing device 100 including prescription, or corrective lenses 107. Some example ophthalmic fit measurements are shown in FIGS. 2A-2D. Ophthalmic fit measurements may include, for example, a pupil height PH (a distance from a center of the pupil to a bottom of the lens 107), including, for example, a left pupil height and a right pupil height. Ophthalmic fit measurements may include an interpupillary distance IPD (a distance between the pupils). IPD may be characterized by a monocular pupil distance, for example, a left pupil distance LPD (a distance from a central portion of the bridge of the nose to the left pupil) and a right pupil distance RPD (a distance from the central portion of the bridge of nose to right pupil). Ophthalmic fit measurements may include a pantoscopic angle PA (an angle defined by the tilt of the lens 107 with respect to vertical). Ophthalmic fit measurements may include a vertex distance V (a distance from the cornea to the lens 107) including, for example a left vertex distance and a right vertex distance. Ophthalmic fit measurements may include other such parameters, or measures that provide for the sizing and/or fitting of a head mounted wearable computing device 100 including a display device 104 as described above. FIG. 2C illustrates a vertex distance V associated with a relatively lower diopter lens 107. FIG. 2D illustrates a vertex distance V associated with a relatively higher diopter lens 107. Ophthalmic fit measurements may be taken into account when fitting the wearable computing device 100, including the display device 104, for the user. For example, ophthalmic fit measurements (together with display fit measurements) may provide for placement of the display of content by the display device 104 within an eye box defined by a three-dimensional volume extending between the lens 107 and the eye of the user, where the display of content will be within the field of view of the user, and within a corrected field of view of the user, and thus visible to the user.

As described above, in a system and method, in accordance with implementations described herein, image data (captured via an application executing on a computing device operated by the user, such as the computing device 200 described above) may be used to determine wearable fit and/or display fit and/or ophthalmic fit measurements to size and fit the wearable computing device 100 (including the display device 104 and/or corrective lenses 107) for the user. A three-dimensional model of the head of the user may be generated, or produced, or defined, based on measurements (for example, measurements of physical attributes of the user) detected within the captured image data. In a situation in which the computing device 200 does not include depth sensing capability, accuracy of the measurements of these physical attributes may be improved by the use of the reference device having the known scale, as noted above. Accuracy of the three-dimensional model may provide for accurate sizing and/or fitting of the wearable computing device 100, and improved functionality of the wearable computing device 100 including the display device 104 and/or corrective lenses 107.

In a situation in which the wearable computing device 100 to be sized and or fitted is the head mounted display device in the form of smart glasses as described above with respect to FIGS. 1A-1C, the reference device can be a pair of glasses that are worn by the user during at least a portion of the capture of the image data. In some examples, the glasses may be the user's personal pair of glasses, or another pair of glasses accessible to the user. In some examples, standard measures are associated with physical features of the glasses used as the reference device. The standard measures associated with the glasses may provide a known scale that can be used in generating, or defining, or producing the three-dimensional model of the head of the user, which is accurate in scale, for the sizing and/or fitting of the wearable computing device 100. As noted above, the image data may be captured by the user, using an application running on a mobile computing device of the user, such as, for example, the mobile computing device 200 described above. In some examples, an image sensor, or camera, of the mobile computing device 200 may be used to capture the image data, without relying on data collected by a depth sensor. In examples in which the computing device 200 includes a depth sensor, the image data may include depth data captured by the depth sensor.

Figure 3:
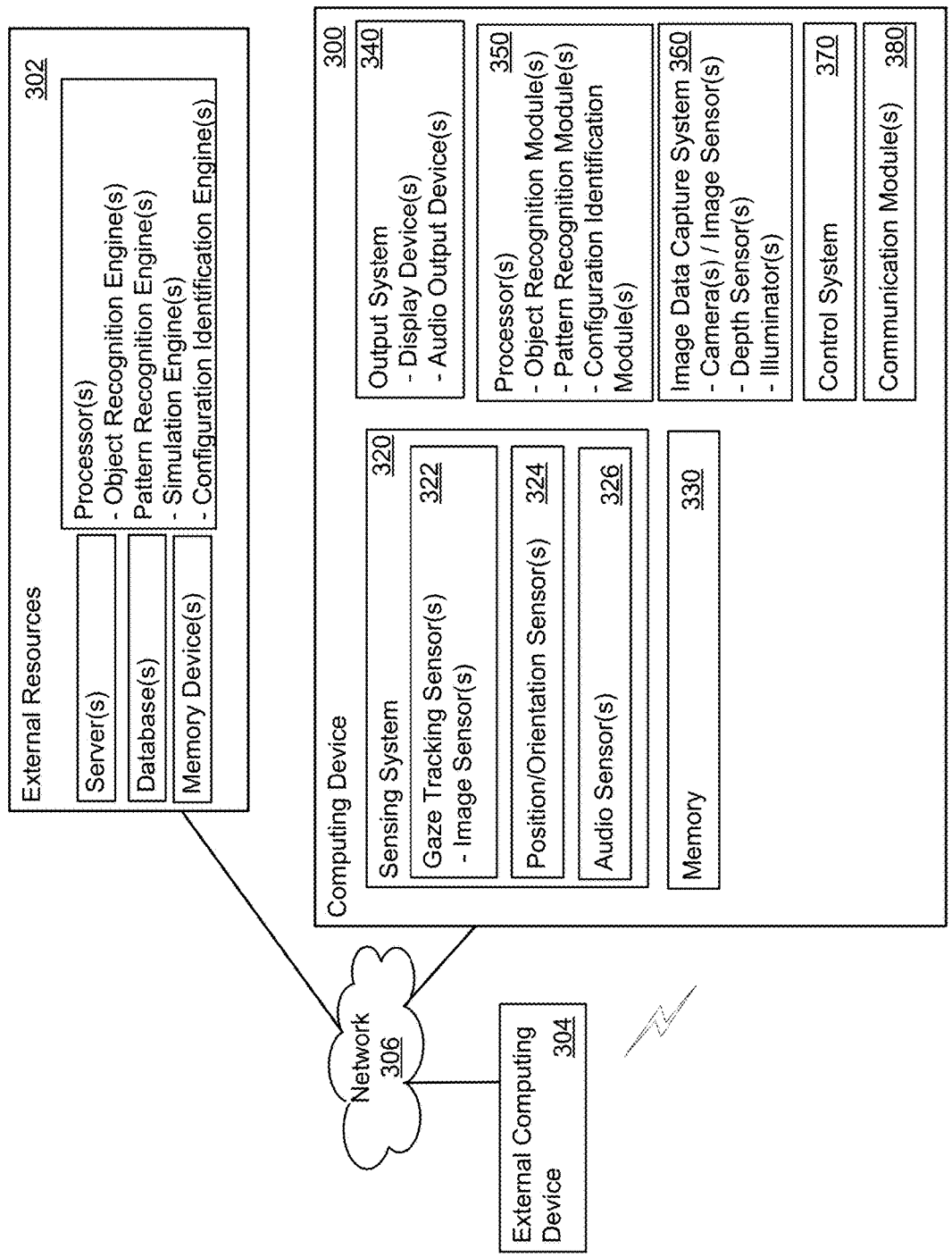
FIG. 3 is a block diagram of a system, in accordance with implementations described herein.

FIG. 3 is a block diagram of an example system for determining wearable fit and/or display fit and/or ophthalmic fit measurements for a wearable computing device, in accordance with implementations described herein. The system may include one or more computing devices 300. The computing device 300 can communicate selectively via a network 306 to access external resources 302 such as, for example, server computer systems, processors, databases, memory storage, and the like. The computing device 300 can operate under the control of a control system 370. The computing device 300 can communicate with one or more external computing devices 304 (another wearable computing device, another mobile computing device and the like) either directly (via wired and/or wireless communication), or via the network 306. The computing device 300 may include a communication module 380 to facilitate external communication. The computing device 300 can include a sensing system 320 including various sensing system components including, for example one or more image sensors 322, one or more position/orientation sensor(s) 324 (including for example, an inertial measurement unit, accelerometer, gyroscope, magnetometer and the like), one or more audio sensors 326 that can detect audio input, and other such sensors. The computing device 300 can include more, or fewer, sensing devices and/or combinations of sensing devices.

In some implementations, the computing device 300 includes one or more image sensor(s), or camera(s) 360. The camera(s) 360 can include, for example, outward facing cameras, world facing cameras, and the like that can capture still and/or moving image data related to an environment outside of the computing device 300. In some implementations, the one or more camera(s) 360 can include a depth sensor. The still and/or moving image data may be displayed by a display device of an output system 340 and/or transmitted externally via the communication module 380 and the network 306, and/or stored in a memory 330 of the computing device 300. The computing device 300 may include one or more processor(s) 350. The processor(s) 350 may include various modules or engines configured to perform various functions. In some examples, the processor(s) 350 include object recognition module(s), pattern recognition module(s), configuration identification modules(s), and other such processors. The processor(s) 350 may be formed in a substrate configured to execute one or more machine executable instructions or pieces of software, firmware, or a combination thereof. The processor(s) 350 can be semiconductor-based that include semiconductor material that can perform digital logic. The memory 330 may include any type of storage device that stores information in a format that can be read and/or executed by the processor(s) 350. The memory 330 may store applications and modules that, when executed by the processor(s) 350, perform certain operations. In some examples, the applications and modules may be stored in an external storage device and loaded into the memory 330.

Figure 4A:
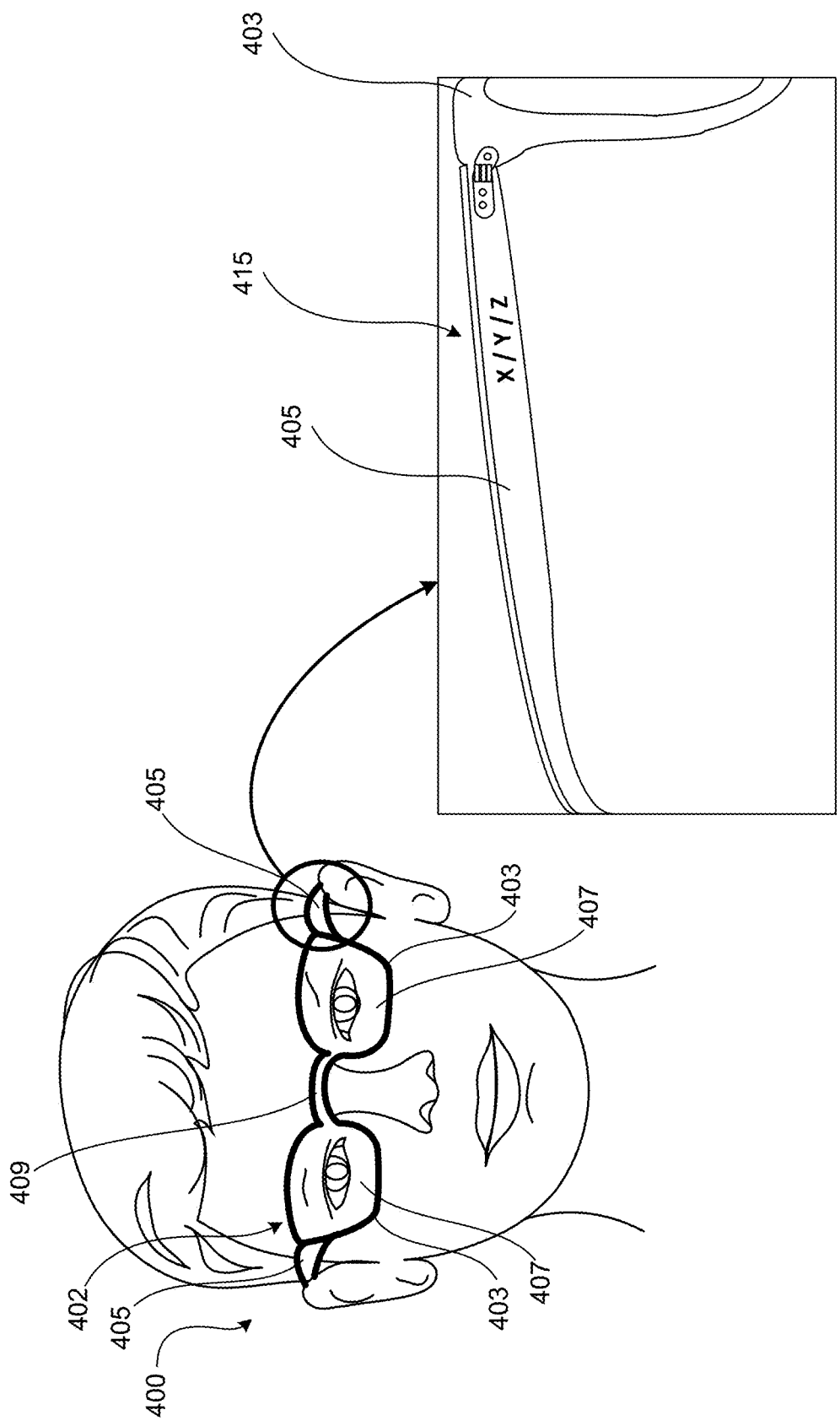
FIG. 4A illustrates a user wearing an example reference device, in accordance with implementations described herein.

FIG. 4A illustrates a user, wearing a pair of personal glasses that are to be used as a known reference device 400 having a known scale, for the sizing and/or fitting of the wearable computing device 100 for the user, in accordance with implementations described herein. As described above, the use of personal glasses may provide a known scale, for example, a known metric scale, in the image data from which other measurements may be determined for the sizing and/or fitting of the wearable computing device 100. In some situations, the use of personal glasses for this purpose may provide a relatively accurate point of reference for the user, in that the personal glasses may provide a known, comfortable, wearable fit. In some situations, the use of personal glasses for this purpose may provide a relatively accurate point of reference in determining parameters for generating, or defining, or producing a three-dimensional model of the head and/or face of the user for the sizing and/or fitting of the wearable computing device 100. In some situations, the personal glasses to be used as the known reference device having the known scale may be glasses that were previously fitted for the user, or previously purchased by the user, for example, in a retail establishment. In some situations, the personal glasses to be used as the known reference device may be glasses that were not necessarily fitted specifically for the user, but are accessible to the user. In this situation, the known scale of the glasses to be used as the known reference device may still be relied upon in generating, or defining, or producing the three-dimensional model and the determination of measurements as described above.

Systems and methods, in accordance with implementations described herein, will include the use of a pair of glasses as a known reference device having a known scale, for purposes of discussion and illustration. Other devices, having associated known measurements or scale, that can be captured within image data of a user, may function as a known reference device.

Figure 4B:
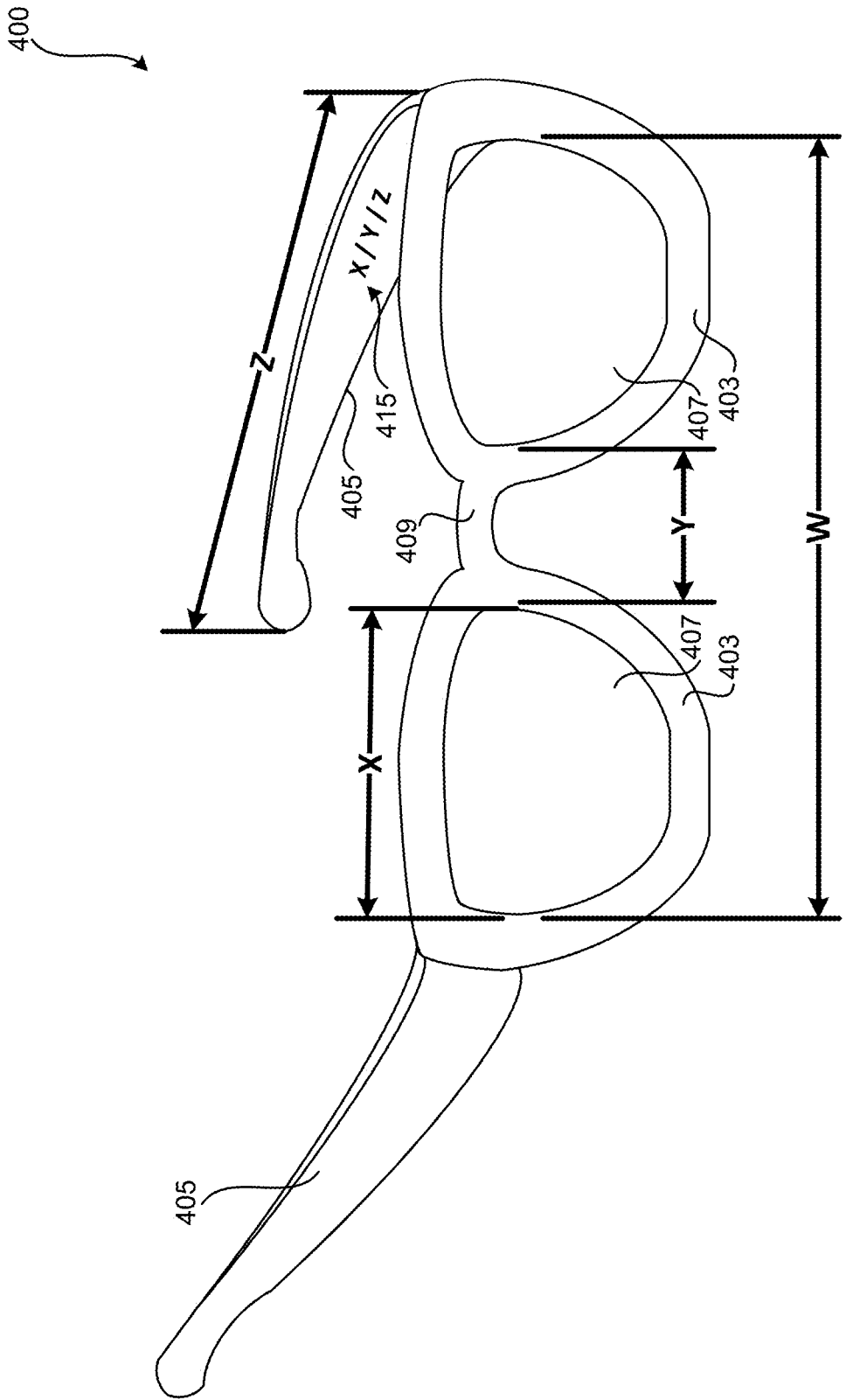
FIG. 4B illustrates the identification of a known scale associated with the known reference device, in accordance with implementations described herein.

The example glasses defining the known reference device 400 shown in FIGS. 4A and 4B include a frame 402 including rim portions 403 and temple arm portions 405 coupled to respective outer side portions of the rim portions 403. Glass portions, or lenses 407 are positioned in the rim portions 403. A bridge portion 409 extends between respective inner side portions of the rim portions 403. The example frame 402 shown in FIG. 4A includes a measurement indicator 415 associated with set characteristics of the frame 402. In the example shown in FIG. 4A, the measurement indicator 415 is provided on an inner side of one of the temple arm portions 405, simply for purposes of discussion and illustration. The measurement indicator 415 may be provided at other locations on the frame 402. The measurement indicator 415 may define set characteristics associated with the specific frame 402 on which the measurement indicator 415 is provided. As shown in FIGS. 4A and 4B, the measurement indicator 415 may include a first measurement X representing a width of the lens 407 received in the rim portion 403 of the frame 402. The measurement indicator 415 may include a second measurement Y representing a width of the bridge portion 409 of the frame 402. The measurement indicator 415 may include a third measurement Z representing a length of the temple arm portion 405 of the frame 402. In some examples, a frontal width W, or an overall width W of the frame 402 may be calculated based on the first measurement X and the second measurement Y. The frontal width W may represent a parameter that is an important factor in the determination of a proper wearable fit of a pair of glasses on a head/face of a user, and in the determination of a proper wearable fit of the wearable computing device 100. That is, the frontal width W, or overall width W may be equal to 2X+Y, or twice the width of the lens 407 plus the width of the bridge portion 409. In some implementations, the measurements X, Y, Z may be provided in millimeters. In some situations, a peripheral portion (a relatively small peripheral portion) of the lens 107 may be engaged in a corresponding bezel at an inner peripheral portion of the corresponding rim portion 103, thus resulting in a relatively small overlap between the rim portion 103 and the lens 107. This (relatively small) overlap between the lenses 107 and the respective rim portions 103 may result in a relatively slight discrepancy between the width of the lens 107 represented by the first measurement X and the observed width of the lens 107 that is visible from a frontal view. In some implementations, this slight discrepancy may be taken into consideration in the sizing/fitting process. In some situations, this slight discrepancy may be negligible in the sizing/fitting process. The measurement indicator 415 may be included on the frame 402 by the manufacturer, as part of the fabrication process. The first measurement X, the second measurement X and the third measurement Z and/or the frontal width W associated with the glasses functioning as the known reference device 400 worn by the user may be inputs into an algorithm used to generate the three dimensional model of the head/face of the user and the determination of wearable fit and/or display fit and/or ophthalmic fit in the sizing and/or fitting of the wearable computing device 100 for the user. The first, second and third measurements X, Y, Z and/or the overall width W may provide a known scale within the image data captured via the application executing on the computing device operated by the user. The known scale within the captured image may, in turn, be used to associate measurements with detected cranial/facial features for generating the three-dimensional model of the user's head and the sizing/fitting of the wearable computing device 100 for the user.

Figure 4C:
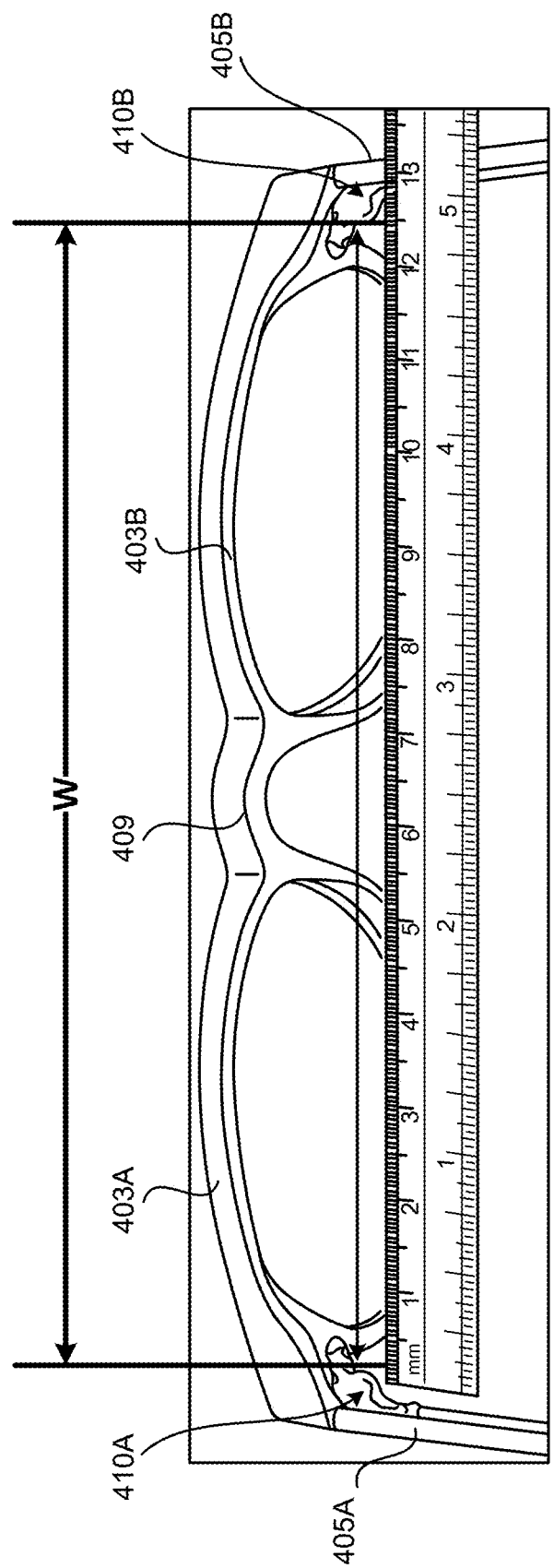
FIGS. 4C and 4D illustrate the identification of a known scale associated with a known reference device, in accordance with implementations described herein.
Figure 4D:
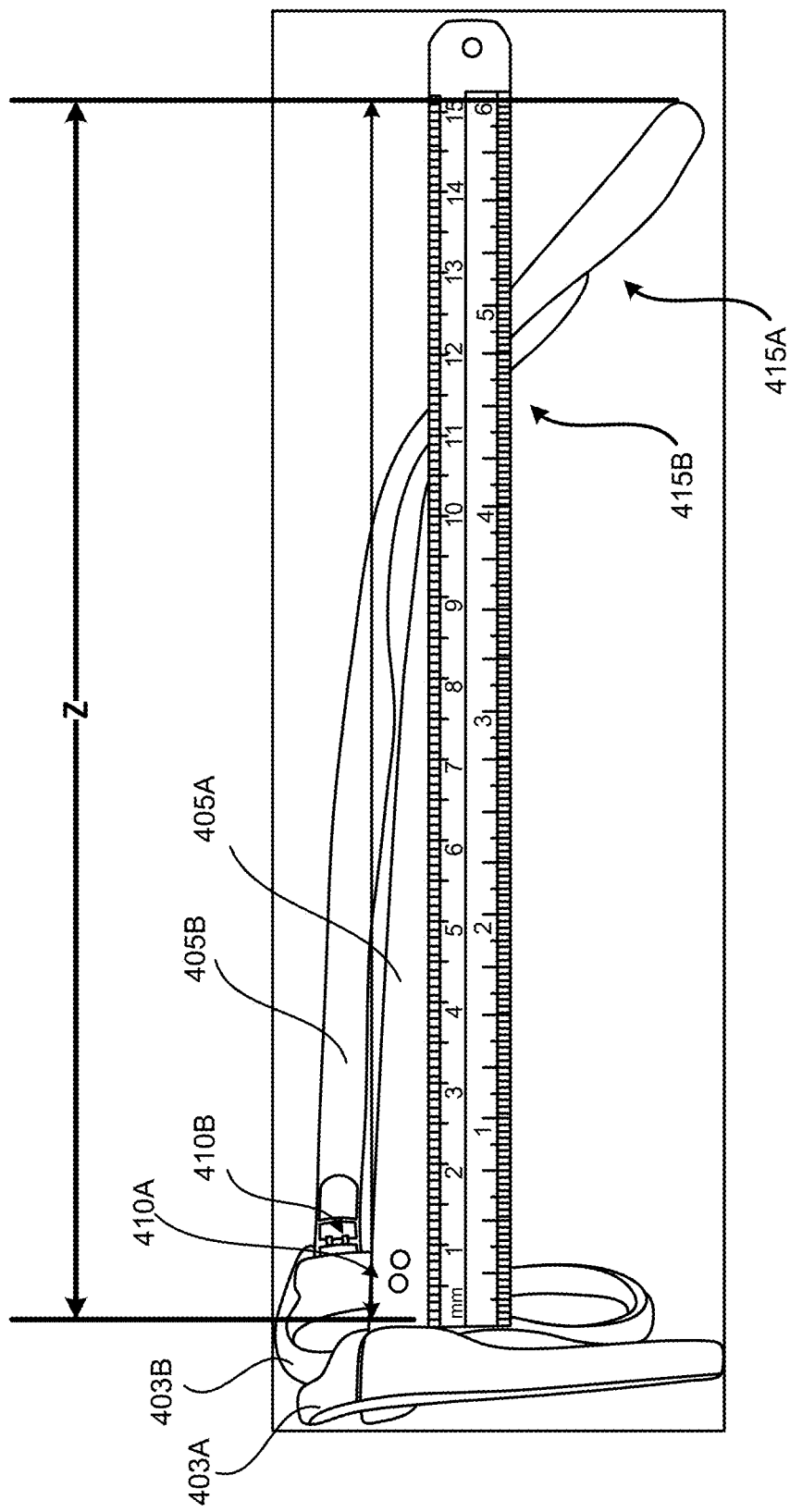

In some situations, the frame 402 selected for use as the known reference device 400 may not include a measurement indicator as described above with respect to FIGS. 4A and 4B. In this situation, measurements of the frame 402 may be determined as shown in FIGS. 4C and 4D. Measurements determined as shown in FIGS. 4C and 4D may be provided as inputs into the algorithm used to generate the three dimensional model of the head/face of the user and the determination of wearable fit and/or display fit and/or ophthalmic fit in the sizing and/or fitting of the wearable computing device 100 for the user.

As shown in FIGS. 4C and 4D, a first hinge 410A may rotatably or pivotably couple a first temple arm portion 405A and a first rim portion 403A of the frame 402. A second hinge 410B may rotatably or pivotably couple a second temple arm portion 405B and a second rim portion 403B of the frame 402. In absence of a measurement indicator as described above with respect to FIGS. 4A and 4B, the frontal width W, or overall width W may be measured by the user between the first hinge 410A and the second hinge 410B, as shown in FIG. 4C. In this example, the third measurement Z representing the length of the temple arm portion 405A, 405B may be measured by the user between a first end portion of the temple arm portion 405A, 405B corresponding to the respective hinge 410A, 410B, and a second end portion of the temple arm portion 405A, 405B corresponding to an ear saddle point portion 415A, 415B of the respective of the temple arm portion 405A, 405B. The ear saddle point portion 415A, 415B of each temple arm portion 405A, 405B may be designed to rest on the ears of the user. In some examples, the measurement Z corresponding to the length of the temple arm portions 405A, 405B may instead follow the entire contour of the temple arm portions 405A, 405B, extending from the respective hinge 410A, 410B, through the bend transitioning into the ear saddle point portions 415A, 415B. The measurement Z corresponding to the length of the temple arm portions 405A, 405B, the measurements X and Y corresponding to the frontal width W determined as described above, and the positioning of the bridge portion 409/second measurement Y corresponding to the width of the bridge portion 409 may provide for proper seating of the glasses on the face of the user, alignment of the eye box/lenses in the line of sight of the user, and the like. In some examples, the frontal width W, or overall width W and/or the third measurement Z corresponding to the length of the temple arm portion 405 may be measured using a measuring device such as a ruler, a tape measure, calipers and the like. In some examples, the frontal width W, or overall width W and/or the third measurement Z corresponding to the length of the temple arm portion 405 may be measured in millimeters.

As noted above, a user may operate a computing device, such as the computing device 300 described above, to capture images including the glasses as the known reference device 400 having the known scale for the fitting of the wearable computing device 100. The images may be captured via an application executing on a computing device 300 operated by the user, allowing the user to capture the information relied upon for the sizing and/or fitting of the wearable computing device 100 in an unsupervised, or unproctored, or self-directed manner, and without the need for an appointment with an agent, either virtual or in person.

Figure 5A:
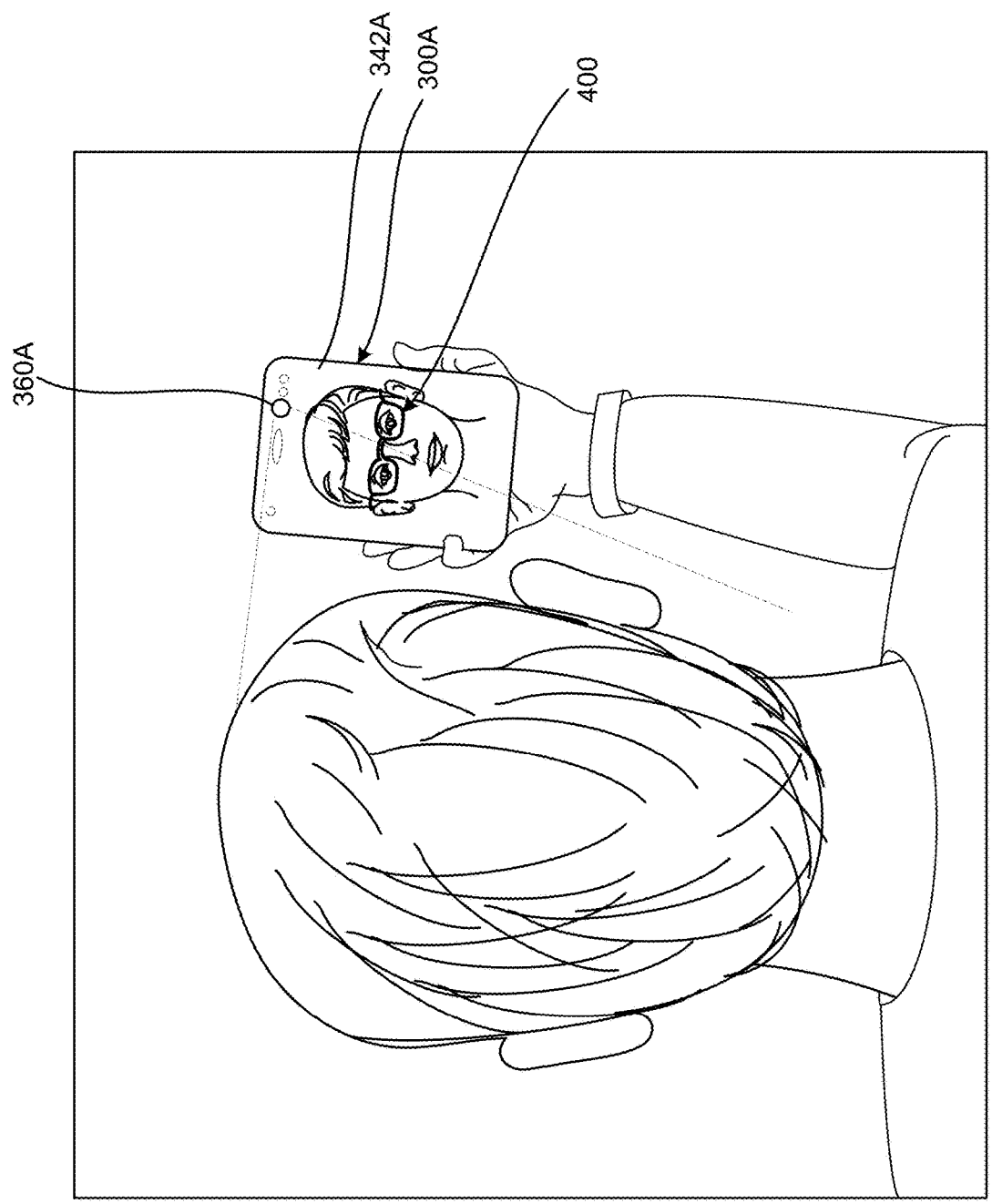
FIGS. 5A and 5B illustrate example image capture modes, in accordance with implementations described herein.
Figure 5B:
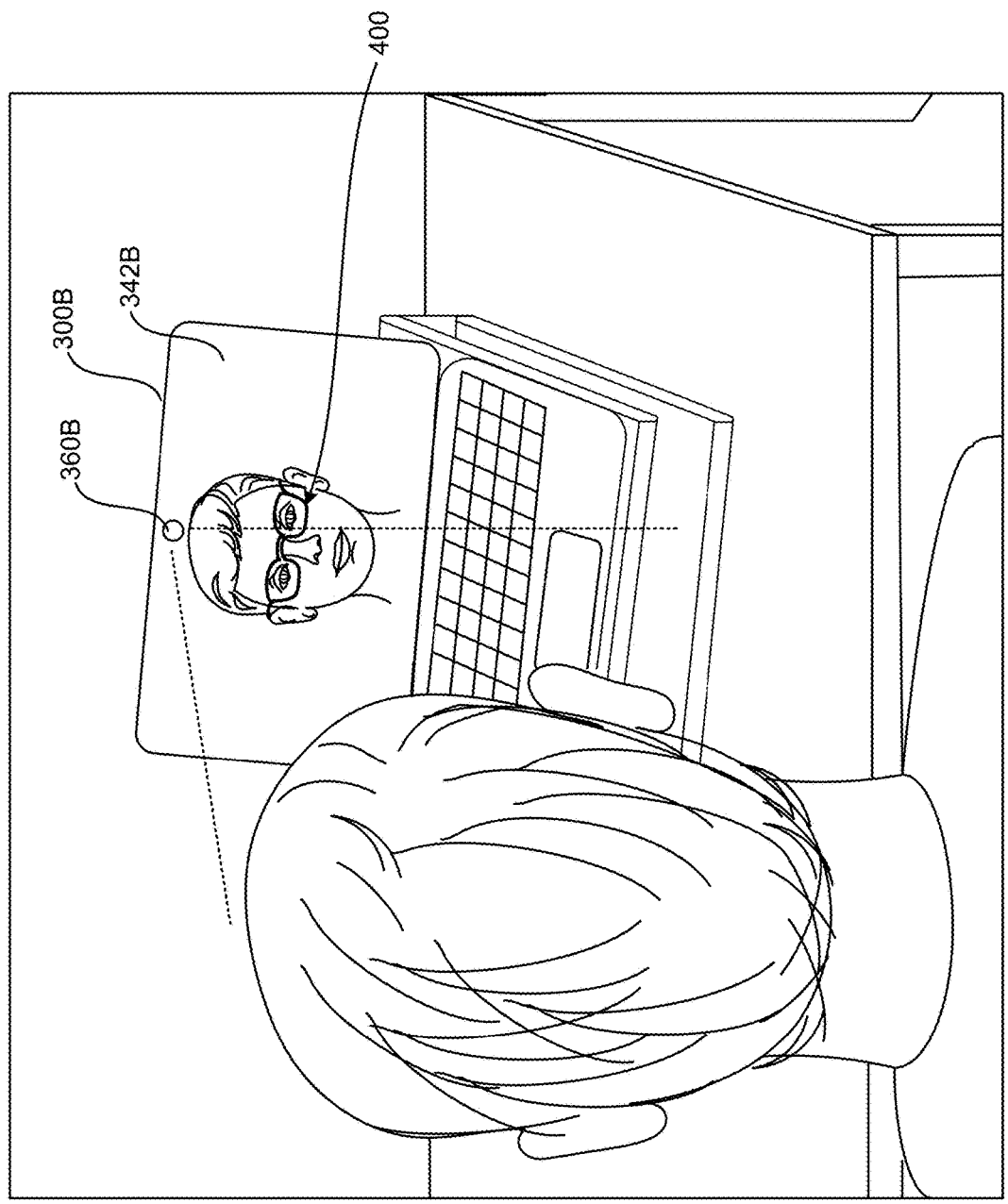

FIG. 5A illustrates an example computing device in the form of a handheld computing device 300A, such as a smartphone. FIG. 5B illustrates an example computing device in the form of a laptop computing device 300B. In the example shown in FIG. 5A, the user is holding the example handheld computing device 300A so that the head and face of the user, and the known reference device 400 having the known scale, is in the field of view of a camera 360A of the computing device 300A. In this arrangement the camera 360A can capture an image of the head and face of the user, including the known reference device 400. The captured image may be displayed to the user on a display device 342A of the computing device 300A, so that the user can verify that his/her head and face and the known reference device 400 are captured within the field of view of the camera 360A. Similarly, as shown in FIG. 5B, the example laptop computing device 300B is positioned relative to the user so that the head and face of the user, and the known reference device 400, are captured within the field of view of the camera 360B of the computing device 300B, and the camera 360B can capture an image of the head and face of the user, along with the known reference device 400. The captured image may be displayed to the user on a display device 342B of the computing device 300B, so that the user can verify that his/her head and face, and the known reference device 400, are captured within the field of view of the camera 360B.

In the example arrangements shown in FIGS. 5A and 5B, image data captured by the camera 360, together with measurement data associated with the reference device 400 as described above, may serve as inputs to a process in which the three-dimensional model of the user's head is generated, or defined, or produced, and wearable fit and/or display fit and/or ophthalmic fit of the wearable computing device 100 are determined for the particular user. These inputs may be processed (for example, by recognition engine(s) and simulation engine(s) of external processor(s) as shown in FIG. 3) based on the known scale provided by the known reference device 400 to determine wearable fit and/or display fit and/or ophthalmic fit parameters. These inputs may be processed to determine for example, frame and/or lens sizing, fitting, contouring and the like, display device configuration, and the like for the customization of a wearable computing device, such as, for example, the head mounted wearable computing device 100 shown in FIGS. 1B and 1C for the user.

FIGS. 5A and 5B provide two examples of computing devices 300 which may be used to capture image data. The captured image data may be processed, together with measurement information associated with the known reference device 400, obtained in the manner described above with respect to FIGS. 4A-4B and/or FIGS. 4C-4D. The known measurement information may provide scale, which may be used to accurately generate the three-dimensional model of the user's head and to size and/or fit, by a sizing simulator, or a fit simulator, a wearable device in accordance with the systems and methods described herein. The principles to be described herein may be carried out by other types of computing devices, and in particular computing devices capable of executing applications thereon to make use of image capture capability, display capability, and external communication and processing to collect and process wearable fit and/or display fit and/or ophthalmic fit for customizing a wearable computing device for a particular user.

Systems and methods, in accordance with implementations described herein, may generate, or define, or produce a model, for example, a three-dimensional model, of the face and/or head of the user based on image data captured by the computing device operated by the user. The image data may include the known reference device having the known scale. The system may rely on the known scale associated with the known reference device to determine measurements, for example, optical measurements and/or facial measurements and/or cranial measurements and the like, associated with the determination of wearable fit parameters and/or display fit parameters and/or ophthalmic fit parameters for the sizing and/or fitting of the wearable computing device 100 for the user. In some examples, a simulation is applied to the model, for example the three-dimensional model, to virtually fit configurations of head mounted wearable computing devices on the three-dimensional model, to select a head mounted wearable computing device for the user. The use of the known reference device 400 having the known scale to, in turn, determine accurate optical and/or facial and/or cranial measurements from the captured image data may yield a relatively accurate three-dimensional model and a relatively accurate determination of wearable fit and/or display fit and/or ophthalmic fit for the particular user.

In some examples, the fitting simulation makes use of detectable features in the three-dimensional model and known features of available head mounted wearable computing devices to fit the head mounted wearable computing device for the user. In some examples, an output of the simulation may include one or more frame selections which may produce a wearable fit and a display fit which will allow the user to view content output by the display device of the head mounted wearable computing device. In some examples, the simulation may generate a three-dimensional model of the selected frames on the face of the user to incorporate ophthalmic fit measurements. This may allow the head mounted wearable computing device including the display device to be configured to accommodate corrective/prescription lenses. As noted above, in some examples, the image data (including the known reference device 400) may be captured by a computing device (such as the computing device 300 described above) operated by the user. This may allow image data to be captured, the simulation to be executed, and the head mounted wearable computing device to be fitted for the user without relying on access to a retail establishment, and without relying on a proctor to supervise the capture of image data and/or to capture the image data. In an example in which the computing device 300 operated by the user does not include a depth sensor, a three-dimensional model and/or a depth map of the face/head of the user may be generated based on the images captured and the known scale provided by the known reference device 400.

As noted above, a system and method in accordance with implementations described herein allows a user to use a personal computing device such as, for example, a smartphone or a laptop computer, as shown in FIGS. 5A and 5B, or other properly equipped personal computing device, to capture images (including the known reference device) from which wearable fit parameters and/or display fit parameters and/or ophthalmic fit parameters may be derived. The user may choose to use the personal computing device to capture these images in an unsupervised, or unproctored manner, using an application executing on the personal computing device, rather than, for example, in an appointment with a proctor or consultant, either virtually or in person/in a retail establishment. The ability to accomplish the fitting of a head mounted wearable computing device in this manner may provide the user with a convenient, uncomplicated, accurate and reliable process for the selection and purchase of the head mounted wearable computing device. Hereinafter, the process for the selection and purchase of the head mounted wearable computing device will be described with reference to the example smart glasses 100 shown in FIGS. 1B and 1C, for purposes of discussion and illustration. Principles to be described herein may be applied to other types of head mounted wearable computing devices.

In some examples, features of the application executing on the computing device, such as the example computing device 300 shown in FIGS. 3, 5A and 5B, may facilitate the user-implemented entry of inputs, capture of image data, including the known reference device 400, and the like, for use by the sizing/fit simulator in fitting a head mounted wearable computing device, such as the example smart glasses 100 shown in FIGS. 1B and 1C, for the user. For example, in some implementations, the system may prompt the user to provide inputs associated with the known reference device 400 prior to initiating image capture. In some implementations, the system may prompt the user to provide the inputs associated with the known reference device 400 after image capture is complete. In some implementations, the system may request that the user provide some inputs associated with the known reference device 400 prior to initiating image capture, and to provide some inputs after the completion of image capture. The inputs associated with the known reference device 400 may include, for example, scale data or measurement data associated with the known reference device 400, as described above with respect to FIGS. 4A-4D.

FIGS. 6A-6F and 7A-7J illustrate an example process for capturing image data, including the known reference device 400 worn by the user, and known scale or measurement data associated with the known reference device 400, for the sizing and/or fitting of the wearable computing device 100 for the user. FIGS. 6A-6F illustrate example user interfaces which may be generated by the application executing on the computing device 300, and displayed on the display device 342 of the computing device 300. The user interfaces shown in FIGS. 6A-6F are provided for purposes of discussion and illustration. Other user interfaces, combinations of user interfaces, ordering of user interfaces and the like may be generated and displayed by the application to allow the user to input (and the system to receive) the known scale data associated with the known reference device 400 in the form of glasses in the possession of the user.

In FIG. 6A, the user has launched the application on the computing device 300, and a first user interface screen 610 is displayed, allowing the user to select a menu item 611 to initiate a virtual fitting. In response to the selection of the menu item 611, a second user interface screen 620 is displayed, as shown in FIG. 6B. The second user interface screen 620 provides for selection of a first menu item 621 allowing the user to enter measurements related to the glasses serving as the known reference device 400. In particular, a third user interface screen 630 may be generated and displayed in response to selection of the first menu item 621 from the second user interface screen 620. The third user interface screen 630 includes a first section 631 that provides for the user input of measurements related to the glasses serving as the known reference device 400 when the glasses include the measurement indicator 415 as described above with respect to FIGS. 4A and 4B. The third user interface screen 630 includes a second section 632 providing for the user input of measurements related to the glasses serving as the known reference device when the glasses do not include the measurement indicator 415, and instead the user has taken measurements of the glasses as described above with respect to FIGS. 4C and 4D.

In some implementations, the application executing on the computing device 300 may allow for the optical scanning and detection of the measurement indicator 415 provided on the glasses serving as the known reference device 400 rather than manual entry of these measurements by the user.

In the example shown in FIG. 6B, the second user interface screen 620 also includes a second menu item 622. Selection of the second menu item 622 provides for user input of a known interpupillary distance (IPD). That is, in some situations, the user may have previously had an interpupillary distance measurement taken and documented such as, for example, during an eye exam, a previous fitting of glasses and the like. In some implementations, the known interpupillary distance may provide a known scale in the captured image data, from which other optical/facial/cranial measures may be scaled, the three-dimensional model be generated, and the wearable computing device 100 fitted for the user.

In the example shown in FIGS. 6A-6C, the user has selected the first menu item 621 from the second user interface screen 620, proceeds to enter measurements associated with the glasses serving as the known reference device 400 at the third interface screen 630 (via either the first section 631 or the second section 632 of the third user interface screen 630) as described above. In this example, in response to completion of the input of measurements via the third interface screen 630, a fourth interface screen 640 may be displayed, as shown in FIG. 6D, providing another opportunity to provide a known interpupillary distance, if available. In some situations, input of the known interpupillary distance, if known, in addition to the measurements associated with the glasses serving as the known reference device 400, may provide for improved accuracy in generating, or defining, or producing three-dimensional model, and for improved accuracy in the determination of wearable fit and/or display fit and/or ophthalmic fit for the user.

In this example, in response to completion of the input of the known measurements via the third interface screen 630 and/or the input of the known interpupillary distance via the fourth interface screen 640, a fifth interface screen 650 may be displayed, as shown in FIG. 6E. The fifth interface screen 650 may provide for user input of optical prescription/corrective lens parameters. In some implementations, the fifth user interface screen 650 may additionally or alternatively provide for the upload, or scanning of prescription documentation verifying the need for corrective lenses. The input and/or upload of prescription/corrective lens parameters may allow for prescription/corrective lens requirements to be taken into consideration in the configuration of the wearable fit and/or display fit of the wearable computing device 100 for the user. As shown in FIG. 6F, a sixth user interface screen 660 may be output, including an indication to the user that the entered measurements and/or IPD and/or prescription parameters have been successfully received and saved. The sixth user interface screen 660 may include a first menu item 661 allowing the user to save the information that has been input to this point, and a second menu item 662 to proceed to the capture of image data for the sizing and/or fitting of the wearable computing device 100. FIGS. 7A-7J present an example process illustrating example features of the application executing on the computing device 300 that may facilitate the user capture of image data, including the known reference device 400, for the determination of wearable fit and/or display fit and/or ophthalmic fit of the wearable computing device 100.

In FIG. 7A, a first user interface screen 710 may be displayed, and the system may output a prompt, such as, for example a visual prompt 711 prompting the user to position the computing device 300 at eye level, and activate the camera 360 of the computing device 300. In the example shown in FIG. 7A, the prompt 711 is a visual prompt displayed on the display device 342 of the computing device 300. In some examples, the prompt may be, for example, an audible prompt output by the audio output device 344, or speaker 344 of the computing device 300. The first user interface screen 710 may also include a menu item 712, which the user may select to initiate the image capture process once the camera 360 has been activated and the computing device 300 is positioned so that the head of the user and the known reference device 400 are positioned within the field of view of the camera 360. In some situations, it may be difficult for the user to provide a touch input at the display device 342 of the computing device 300 (i.e., selection of the menu item 712) while also maintaining the position of the computing device 300. Accordingly, in some examples, a user input to initiate the image capture process may be in the form of an audible command, or a voice command, that is detected by the audio input device 326, or microphone 326 of the computing device 300. In the example shown in FIG. 7A, the image of the user captured by the camera 360 is displayed on the display device 342, so that the user may verify that the computing device 300/camera 360 is properly positioned to capture images of the face/head of the user wearing the glasses serving as the known reference device 400 prior to providing an input that causes initiation of the image capture process.

A second user interface screen 720 may be displayed in response to the initiation of the image capture process, as shown in FIG. 7B. The system may output an indicator 721 indicating that the image capture process has been successfully initiated, and that the capture of front facing image data is in progress. The example shown in FIG. 7B includes a visual indicator 721. In some examples, the system may output another type of indicator such as, for example an audible indicator via the audio output device 344, or speaker 344.

In some examples, a progress indicator may be output to provide an indication of progress, and completion of the image capture. In the example shown in FIG. 7B, a visual progress indicator is displayed, in the form of, for example, a progress bar 725A, a progress meter 725B. Other types of visual indicators may be output, including for example, color changes in the displayed image, blinking of the indicator 721 and other such visual indicators. In some examples, the progress indicator may be an audible indicator output by the speaker 344 of the computing device 300, providing an indication of progress, and completion. In some examples, detection of completion may be based on reaching a set threshold of time in the image capture mode shown in FIG. 7B, such as, for example, detection that a set period of time has elapsed since the output of the indicator 721. In some examples, the set threshold may be measured based on a detected movement of the computing device 300 (based on, for example, data provided by position and orientation sensors of the computing device 300). In some examples, the set threshold may be measured based on a detected stationary position for a set amount of time after output of the indicator 721. In some examples, the set threshold may be measured based on detected capture of one or more set features. In some examples, the one or more set features may include, for example, detected features associated with the known reference device 400, As shown in FIG. 7C, a third interface screen 730 may be displayed by the display device 342 of the computing device 300 in response to detected completion of the capture of front facing image data. The third interface screen 730 may include an indicator 731 providing the user with an indication that the capture of front facing image data has been completed. The indicator 731 on the third interface screen 730 may provide options to the user for capturing additional image data, for example, profile image data in addition to the front facing image data. In some situations, the additional image data, such as profile image data, may provide for further accuracy in generating, or defining, or producing the three-dimensional model of the user's face/head and the fitting of the wearable computing device 100. This is particularly the case when the known scale associated with the known reference device 400 captured in the image data includes a known temple arm measurement (for example, the third measurement Z as described above with respect to FIGS. 4A-4D). This additional data may also be useful when, for example, the camera 360 of the computing device 300 does not include depth sensing capability.

Figure 7D:
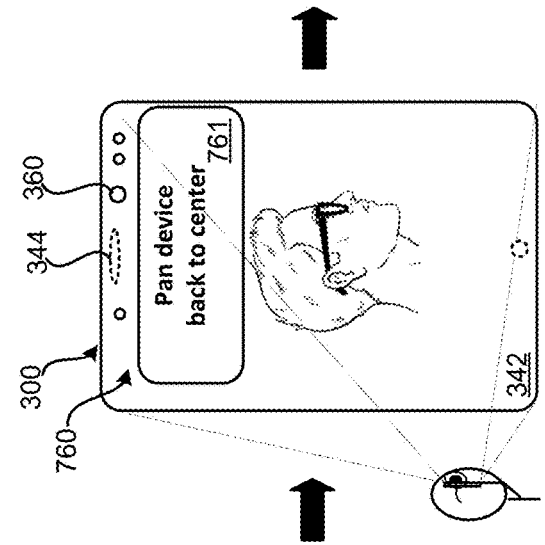
Figure 7E:
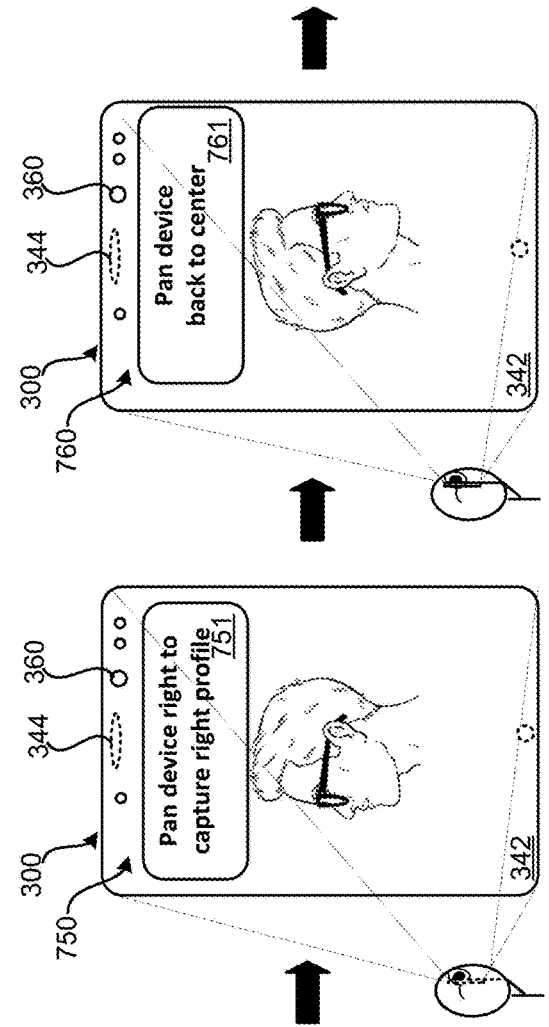
Figure 7F:
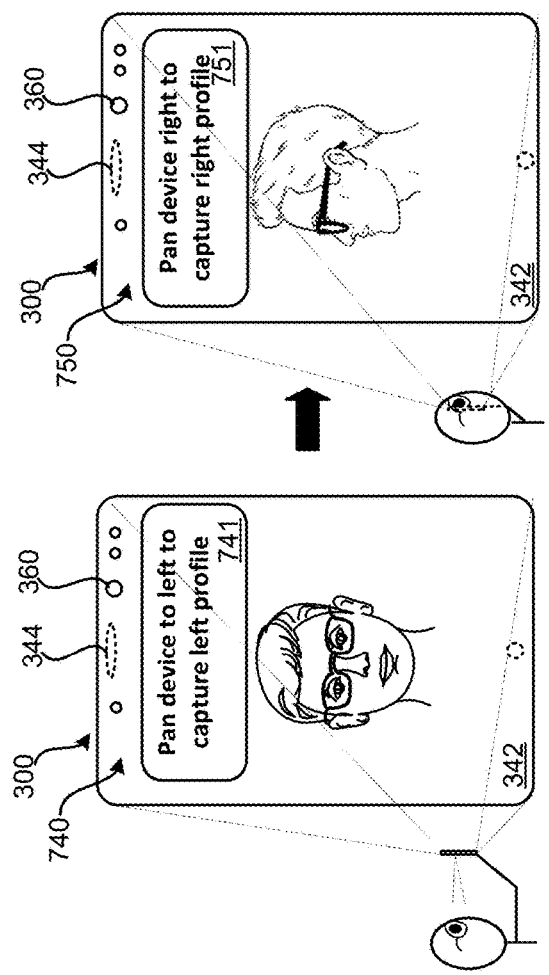
Figure 7G:
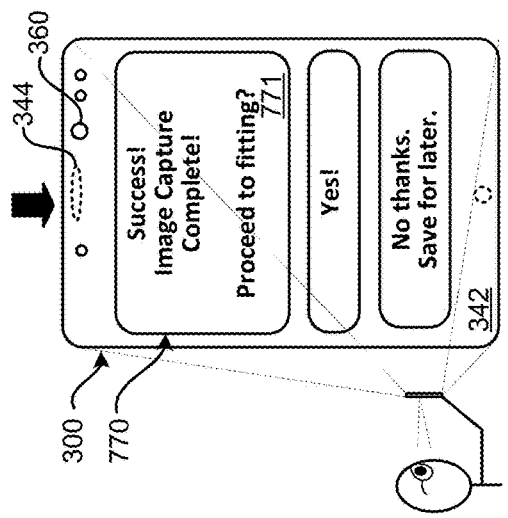

In response to selection of the option to capture additional image data, a fourth user interface screen 740 may be displayed, as shown in FIG. 7D. The example fourth user interface screen 740 includes an example prompt 741 instructing the user to pan the computing device 300 to the left of the user's head while the user continues to look forward, to capture left profile image data. In the example shown in FIG. 7D, the prompt 741 is a visual prompt. However, the prompt may be an audible prompt output by the audio output device 344, or speaker 344 of the computing device 300. A fifth user interface screen 750 may be output in response to the detected completion of capture of the right profile image data, including a prompt 751 instructing the user to pan the computing device 300 to the right, back through the center portion and to the right of the user's head to capture right profile data, as shown in FIG. 7E. In the example shown in FIG. 7E, the prompt 751 is a visual prompt, for purposes of illustration. However, the prompt may be an audible prompt output by the audio output device 344, or speaker 344 of the computing device 300. A sixth user interface screen 760 may be output in response to detected completion of the capture of the right profile image data, as shown in FIG. 7F. The sixth user interface screen 760 may include a prompt 761 instructing the user to pan the device back to the central, or front facing position. In the example shown in FIG. 7F, the prompt 761 is a visual prompt. However, the prompt may be an audible prompt output by the audio output device 344, or speaker 344 of the computing device 300. A seventh user interface screen 770 may be output, including an indicator 771 informing the user that the image capture process is complete, as shown in FIG. 7G. In the example shown in FIG. 7G, the indicator 771 is a visual indicator. However, the indicator may be an audible indicator output by the audio output device 344, or speaker 344 of the computing device 300.

In the capture of right and left profile image data as described with respect to FIGS. 7D-7G, the user's gaze remains focused forward, so that features such as the user's ears, ear saddle points, positioning of the temple arm portions of the glasses serving as the known reference device 400, pantoscopic angle, vertex distance, and other such features may be captured in the profile images. In this arrangement, visual prompt(s) output by the display device 342 are not necessarily easily visible to the user. Thus, the output of audible prompts, in addition to or instead of the example visual prompts described above, may be particularly helpful in the capture of profile image data as described with respect to FIGS. 7D-7G.

In some examples, the system may provide for user correction, redirection and the like in response to detection that image data has not been fully captured and/or not accurately captured and the like. For example, data provided by sensors of the computing device 300 including for example, positional sensors, orientation sensors and the like, together with the image data, may indicate a need for correction of the orientation of the computing device 300 relative to the user's face/head, distance from the user's face/head, and the like. For example, based on data provided by position and/or orientation sensors of the computing device 300, one or more prompts may be output to the user. These additional prompts may include, for example, a prompt indicating that the user hold the computing device 300 in a more upright, or straight, or vertical position, that the user move the computing device 300 so that the capture area is centered on the user's face, that the user move the computing device 300 closer to or further from the user's face, that the user move the computing device 300 vertically upward or downward, and other such prompts, to improve the capture of image data. Similarly, the additional prompts may include a prompt instructing the user to repeat one or more of the image capture sequences.

In some examples, the application executing on the computing device 300 may provide guidance on the further the capture of image data that provides for the detection of measurements such as, for example interpupillary distance and/or monocular pupillary distance, pupil height, and the like. In some examples, this may be done after the known reference device 400 has been used to establish scale within the previously captured images, and the three-dimensional model has been generated. Thus, the additional image capture, and additional measurements, may be accomplished while the user is no longer wearing the glasses serving as the known reference device 400. Images related to the detection of this data may be obtained in an arrangement in which the application guides the user in establishing a natural head position and then guides the eye gaze of the user so that relevant measurements may be taken from the image data collected.

For example, an eighth user interface screen 780 may be displayed on the display device 342 of the computing device 300 to provide guidance to the user in capturing image data from which additional data, for example, optical data can be extracted. In the example shown in FIG. 7H, the eighth user interface screen 780 includes an example prompt 781 guiding the user to direct his/her gaze at the camera 360. In the example shown in FIG. 7H, the prompt 781 includes an arrow pointing at the camera 360 to facilitate the location of the camera 360 by the user. That is, in some examples, the camera 360 may be positioned in a bezel portion of the computing device 300, making the camera 360 particularly difficult to locate for a user who has removed corrective lenses for the purposes of the fitting session. In some examples, the prompt may be an audible prompt, output by the audio output device 344, or speaker 344 of the computing device. In some examples, a progress indicator may be output to provide an indication of progress, and completion, of the capture of the image data. The example shown in FIG. 7H includes a visual progress indicator in the form of a progress bar 785. Other types of visual indicators may be displayed, such as color changes in the displayed image, blinking of the prompt 781 and other such visual indicators. In some examples, the indicator may be an audible indicator output by the speaker 344 of the computing device 300, providing an indication of progress, and completion. In some examples, the set threshold may be measured based on a set period of time that has elapsed since the output of the prompt 781. In some examples, the set threshold may be measured based on a detected dwell time of the computing device 300 (based on, for example, data provided by position and orientation sensors of the computing device 300). In some examples, the set threshold may be measured based on a detection of set features in a stationary position in the captured image data for a set amount of time after the output of the prompt 781, indicating that the user gaze has stabilized.

Figure 7I:
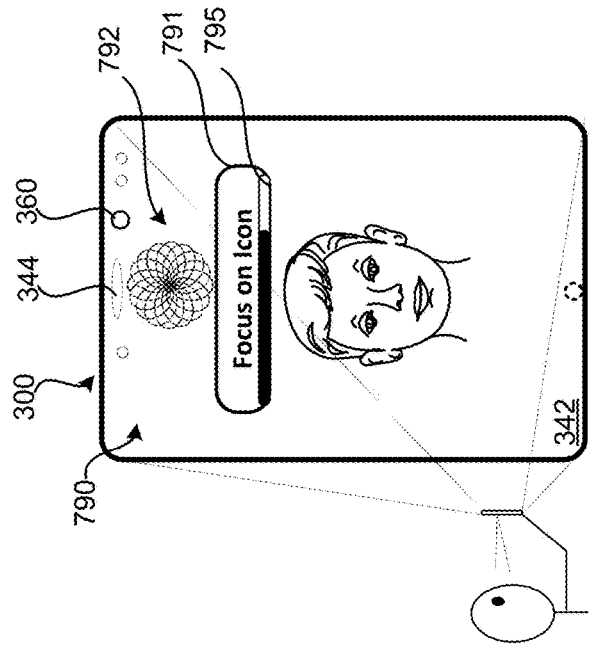

In some examples, the optical data can be detected in a situation in which the user gaze is not specifically directed at the camera 360. For example, given known configuration information related to the computing device (model, resolution of the display device 342, location of the camera 360, and other such information), a three-dimensional gaze location can be determined. FIG. 7I illustrates a ninth user interface screen 790, that may be displayed instead of, or in addition to, the eighth user interface screen 780 to provide guidance to the user in capturing image data from which optical data and measurements can be extracted. In the example shown in FIG. 7I, an example prompt 791 is displayed, guiding the user to direct his/her gaze at an icon 792 displayed on the display device 342. In some situations, the icon 792 may provide for a relatively easy object of focus, and gaze fixation may be obtained relatively quickly. In some examples, the prompt may be an audible prompt, output by an audio output device 344, or speaker 344 of the computing device 300, prompting the user to direct his/her gaze to the icon 792. In some examples, a progress indicator may be output in the form of, for example, a progress bar 795, or other type of visual indicator including for example, color changes in the displayed image, blinking of the prompt 791 and/or the icon 792 and the other such visual indicators. In some examples, the indicator may be an audible indicator output by the speaker 344 of the computing device 300. In some examples, the set threshold may be measured based on a set period of time that has elapsed since the output of the prompt 791. In some examples, the set threshold may be measured based on a detected dwell time of the computing device 300 (based on, for example, data provided by position and orientation sensors of the computing device 300). In some examples, the set threshold may be measured based on a detection of set features in a stationary position in the captured image data for a set amount of time after the output of the prompt 791, indicating that the user gaze has stabilized.

Figure 7J:
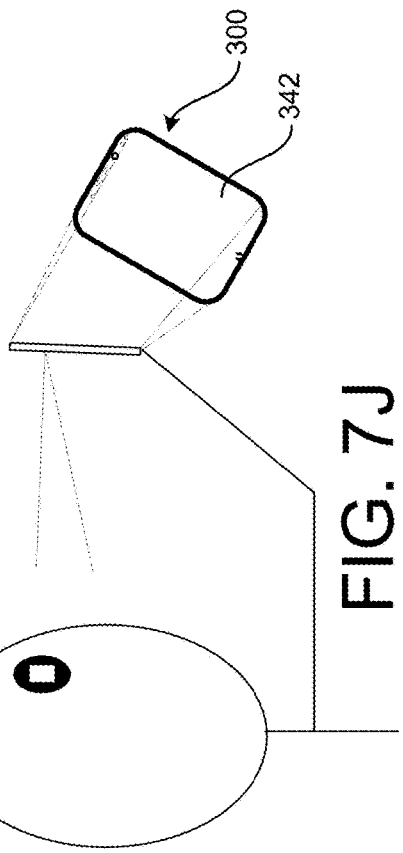
Figure 7H:
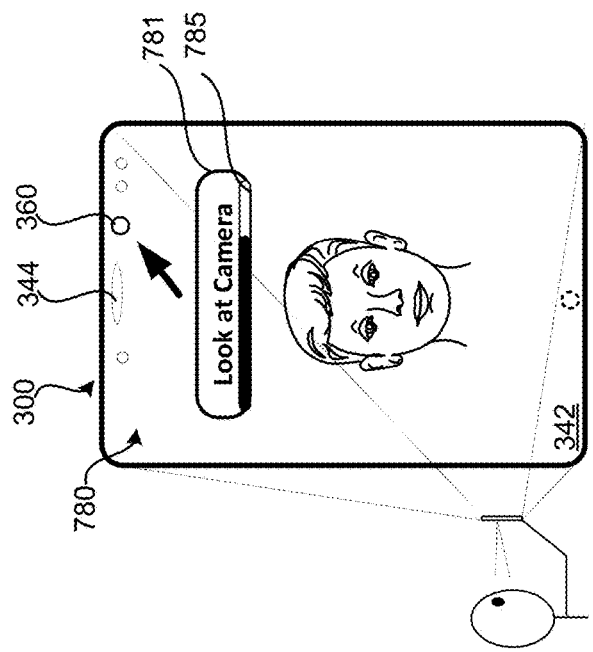

In some examples, the application executing on the computing device 300 may cause the display device 342 to output a monochrome display screen such as, for example, a substantially white display screen during the capture of image data, as shown in FIG. 7J. The monochrome display screen may be reflected in the pupils of the user gazing at the computing device 300. If, in the analysis of the image data, it is determined that the reflection of the monochrome display screen is not centered in the pupils of the user, it may be determined that the user gaze is not properly focused on or directed at the camera 360. In this situation, the system may prompt the user to initiate a re-capture of the image data, may provide prompting as shown in FIGS. 7H and/or 7I, and the like.

FIGS. 6A-7J illustrate example user interface screens of the application executing on the computing device 300 for the fitting of the head mounted wearable computing device 100 for the user operating the computing device 300. The user interface screens may be displayed to the user on the display device 342 of the computing device 300 during a fitting session, as image data is collected for the fitting of the head mounted wearable computing device 100. In some of the example user interface screens shown in FIGS. 6A-7J, example images of the user are shown on the display device 342 of the computing device 300, simply to illustrate user head and gaze position relative to the computing device 300/camera 360. In implementation of the example user interface screens, the image of the user may or may not necessarily be displayed on the display device 342 of the computing device 300, particularly if display of the image causes the user to divert his/her gaze.

The capture of image data including a natural head position or pose, i.e., a manner in which the user naturally holds his/her head, may be a component in generating an accurate three-dimensional model of the user's face/head, and in the accurate sizing and/or fitting of the head mounted wearable computing device 100 for the user. In some examples, the capture of image data that is representative of the natural head position of the user may be facilitated by user interaction with the application executing on the computing device 300 operated by the user. In the examples described above, the computing device 300 is held by the user, with the camera 360 of the computing device 300 facing the user, invoking operation in a self-portrait mode, or a selfie mode. The application executing on the computing device 300 for the sizing and/or fitting of the head mounted wearable computing device 100 for the user may invoke this mode of operation for the capture of image data, so as to capture images of the face/head of the user.

Image data captured through user operation of the example computing devices as described above with respect to FIGS. 6A-7J, may be used to generate the three-dimensional model of the face/head of the user. In some examples, the image data may be analyzed to detect and identify features of the known reference device 400. In the example described above, the image data may be analyzed to detect features of the glasses, such as, for example, the bridge portion 409 of the frame 402, the hinge areas, at which the respective rim portions 403 and temple arm portions 405 are coupled and/or the frame 402 changes direction, and the like. The known measurements associated with these features may then be applied to the determination of measurements associated with other features detected within the image data. In some examples, the sizing/fit simulator may analyze the image data provided by the computing device 300 and/or the three-dimensional model to extract and/or generate head pose information and eye gaze information to be used in fitting the wearable computing device 100 for the user.

Based on the data associated with the three-dimensional model, the simulator may identify one or more frames, such as the example frame 102 of the smart glasses 100 shown in FIGS. 1B and 1C, that may meet the wearable fit and/or the display fit needs of the user. In some examples, the one or more frames may be selected from an inventory of a plurality of different models of frames available for fitting. Known configuration information (sizing/fit, dimensions, shaping, contouring, tilt angle and other such configuration information) may be previously stored in a database in connection with the different models of frames. For example, the configuration information may be stored in a database that is accessible by the simulator, as in the external resources 302 that are in communication with the computing device 300 as shown in FIG. 3. The simulator may compare the facial/cranial features/measurements, optical characteristics and the like detected in the image data captured by the user operating the computing device 300 to the known configuration information of the different models of frames stored in the database. Based on the comparison, the simulator may match, or may determine that one or more frames may provide a fit (a wearable fit and/or a display fit) for the user.

More detailed description of the generation of the three-dimensional model of the user's head, and communication with and operation of the simulator for the fitting of the wearable computing device, based on the measurements detected as described above, may be found in U.S. application Ser. No. 17/302,108 and U.S. application Ser. No. 17,302,487, which are incorporated herein by reference in their entireties.

Figure 8:
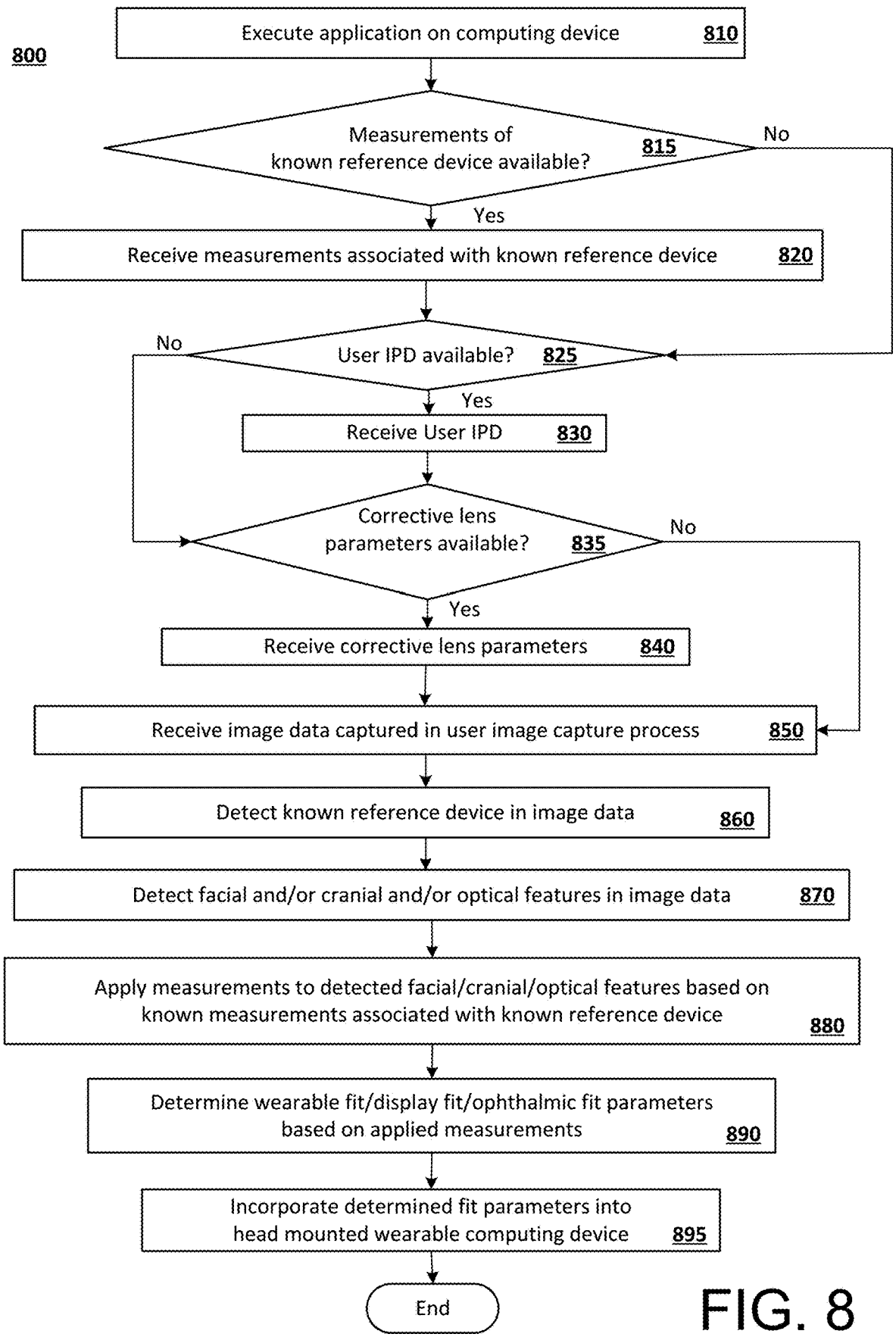
FIG. 8 is a flowchart of an example method, in accordance with implementations described herein.

FIG. 8 is a flowchart of an example method 800, in accordance with implementations described herein. In the example method, a computing system is operated to detect a known reference device having a known scale within image data captured by the computing device, to apply the known scale to facial and/or cranial and/or optical features within the captured image data to the generation of a three-dimensional model, and to fit a wearable computing device for the user based on the three-dimensional model.

As described above, a user operating a computing device (such as, for example, the computing device 300 described above) may cause the computing device to execute an application (block 810). The application may provide for the capture of image data, the detection of a known reference device having a known scale, and the determination of wearable fit measurements and/or display fit measurements and/or ophthalmic fit measurements from the captured image data. The application may execute operation of a module allowing the system to receive user input of measurements associated with the known reference device (block 815, block 820). In the example in which the known reference device is a pair of glasses, as in the examples described above, the known measurements may include, for example, lens width and/or bridge with and/or temple arm length and/or frontal width. The application may execute operation of a module allowing the system to receive user input of optical measurements including interpupillary distance (block 825, block 830). The application may execute operation of a module allowing the system to receive user input, or upload of vision correction parameters, or the user's vision correction prescription (block 835, block 840). Image data, captured during a user-directed image capture process, may be received (block 850). The image data may include images of the user, wearing the known reference device. The system may analyze the image data to detect the known reference device having known/associated measurements (block 860). The system may analyze the image data to detect features associated with the user within the image data (block 870). The detected features may include, for example, facial features/landmarks/contours, optical features including, for example, pupil height, interpupillary distance, left/right monocular pupil distance, the inner and/or outer corners of the eyes (the canthi, or palpebral commissures), and the like. The system may apply the known scale associated with the known reference device to determine measurements associated with the facial and/or optical features detected in the image data (block 880). These measurements may be used to generate, or define, or produce a three-dimensional model of the face/head of the user. The system may use this three-dimensional model to determine wearable fit and/or display fit and/or ophthalmic fit parameters (block 890). The determined fit parameters may be used to select and fit a head mounted wearable computing device for the user (block 895). The system may match one or more head mounted wearable devices, from a plurality of head mounted wearable devices, to user needs and preferences based on the fit parameters from a database of available head mounted wearable devices and configuration information associated with the plurality of available head mounted wearable devices. The system may compare the configuration information associated with the plurality of available head mounted wearable devices to the display fit measurements and/or the ophthalmic fit measurements detected in the captured image information. The system may use the results of the comparison to provide one or more head mounted wearable computing devices that meet the wearable fit and/or display fit and/or ophthalmic fit requirements.

Figure 9:
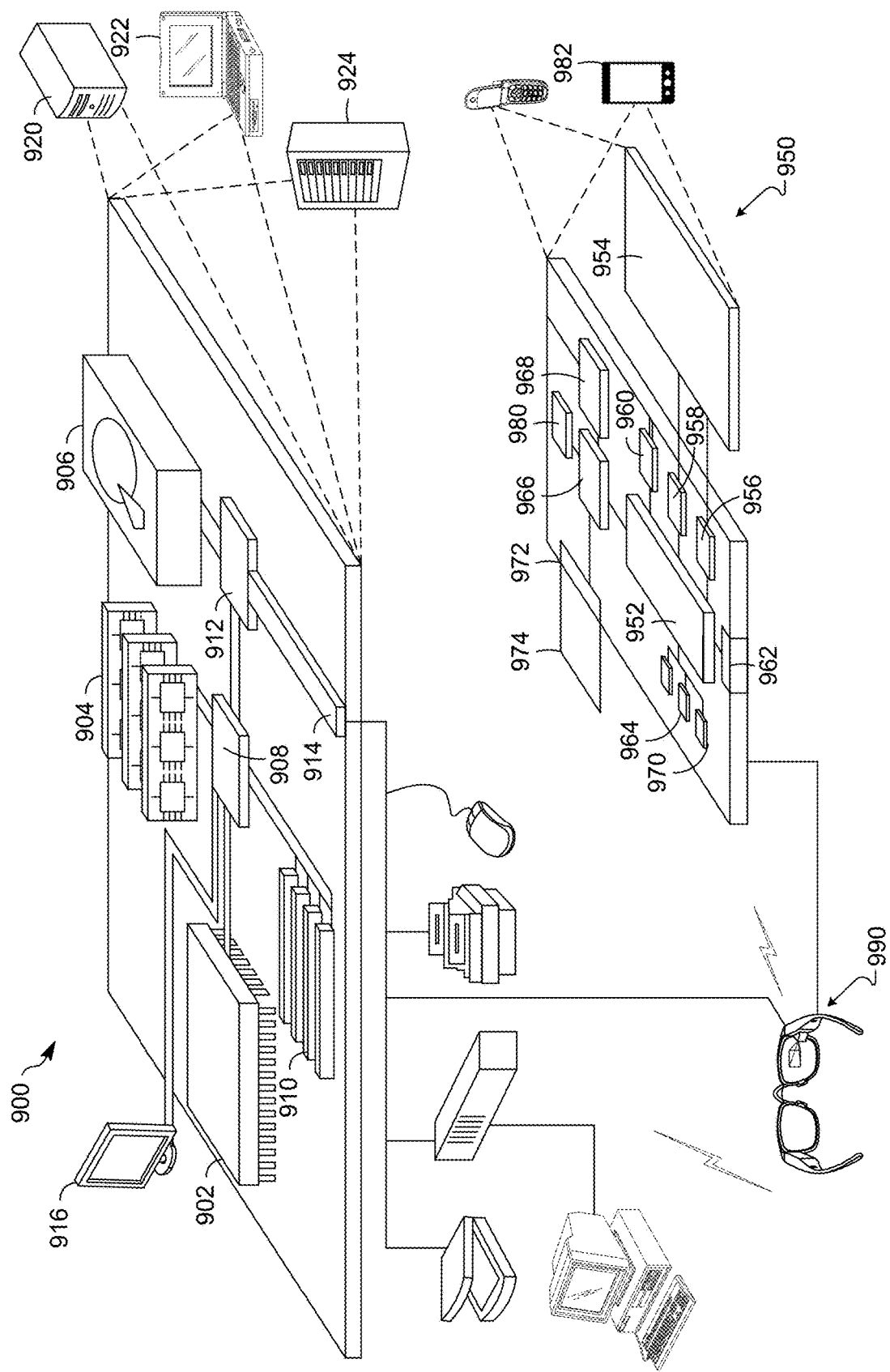
FIG. 9 illustrates example computing devices of the computing systems discussed herein.

FIG. 9 illustrates an example of a computer device 900 and a mobile computer device 950, which may be used with the techniques described here (e.g., to implement the client computing device and/or the server computing device and/or the provider resources described above). The computing device 900 includes a processor 902, memory 904, a storage device 906, a high-speed interface 908 connecting to memory 904 and high-speed expansion ports 910, and a low-speed interface 912 connecting to low-speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high-speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high-speed controller 908 manages bandwidth-intensive operations for the computing device 900, while the low-speed controller 912 manages lower bandwidth-intensive operations. Such allocation of functions is example only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display), and LED (Light Emitting Diode) or an OLED (Organic Light Emitting Diode) display, or other appropriate display technology. The display interface 956 may include appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In-Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provided as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, Wi-Fi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in the figure can include sensors that interface with an AR headset/HMD device 990 to generate an augmented environment for viewing inserted content within the physical space. For example, one or more sensors included on a computing device 950 or other computing device depicted in the figure, can provide input to the AR headset 990 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 950 can use the sensors to determine an absolute position and/or a detected rotation of the computing device in the AR space that can then be used as input to the AR space. For example, the computing device 950 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer. In some implementations, the user can aim at a target location using a virtual laser pointer.

In some implementations, one or more input devices included on, or connect to, the computing device 950 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 950 when the computing device is incorporated into the AR space can cause a particular action to occur in the AR space.

In some implementations, a touchscreen of the computing device 950 can be rendered as a touchpad in AR space. A user can interact with the touchscreen of the computing device 950. The interactions are rendered, in AR headset 990 for example, as movements on the rendered touchpad in the AR space. The rendered movements can control virtual objects in the AR space.

In some implementations, one or more output devices included on the computing device 950 can provide output and/or feedback to a user of the AR headset 990 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 950 may appear as another object in a computer-generated, 3D environment. Interactions by the user with the computing device 950 (e.g., rotating, shaking, touching a touchscreen, swiping a finger across a touch screen) can be interpreted as interactions with the object in the AR space. In the example of the laser pointer in an AR space, the computing device 950 appears as a virtual laser pointer in the computer-generated, 3D environment. As the user manipulates the computing device 950, the user in the AR space sees movement of the laser pointer. The user receives feedback from interactions with the computing device 950 in the AR environment on the computing device 950 or on the AR headset 990. The user's interactions with the computing device may be translated to interactions with a user interface generated in the AR environment for a controllable device.

In some implementations, a computing device 950 may include a touchscreen. For example, a user can interact with the touchscreen to interact with a user interface for a controllable device. For example, the touchscreen may include user interface elements such as sliders that can control properties of the controllable device.

Computing device 900 is intended to represent various forms of digital computers and devices, including, but not limited to laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be examples only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-implemented method, comprising:
receiving, via an application executing on a computing device, image data captured by the computing device, the image data including a head of a user and a reference device worn by the user;
receiving, via an input into the application, at least one measurement associated with the reference device, including:
receiving a first measurement corresponding to a width of a lens portion of a frame of the reference device; or
receiving a second measurement corresponding to a width of a bridge portion of the frame, wherein a frontal width measurement of the frame is two times the first measurement plus the second measurement; or
receiving a third measurement corresponding to a length of an arm portion of the frame;
detecting the reference device in the image data;
associating a scale with the reference device within the image data based on the at least one measurement;
detecting a plurality of features of the head of the user in the image data;
determining a plurality of measurements corresponding to the plurality of features of the head of the user based on the scale associated with the reference device;
producing a three-dimensional model of the head of the user based on the plurality of measurements of the plurality of features of the head of the user; and
receiving, from a simulation engine, a configuration of a head mounted wearable computing device for the user based on the three-dimensional model of the head of the user.

2. The computer-implemented method of claim 1, wherein the reference device is a wearable device including at least one known physical feature, and wherein receiving the at least one measurement associated with the reference device includes:
detecting the at least one known physical feature in the image data captured by the computing device; and
associating a known measurement with the at least one known physical feature.

3. The computer-implemented method of claim 1, wherein detecting the reference device in the image data and associating the scale with the reference device includes:
detecting, within the image data, a first hinge area at which a first rim portion and a first arm portion of the frame are coupled;
detecting, within the image data, a second hinge area at which a second rim portion and a second arm portion of the frame are coupled;
comparing a distance in the image data between the first hinge area and the second hinge area with the frontal width measurement; and
determining a scaling factor based on the comparing.

4. The computer-implemented method of claim 1, wherein detecting the reference device in the image data and associating the scale with the reference device includes:
detecting at least one feature of the reference device in the image data;
associating a known measurement with the at least one feature;
comparing the known measurement associated with the at least one feature to a detected size within the image data of the at least one feature; and
determining a scaling factor based on the comparing.

5. The computer-implemented method of claim 4, wherein producing the three-dimensional model includes applying the scaling factor to the plurality of features of the head of the user.

6. The computer-implemented method of claim 1, wherein the reference device is a pair of glasses worn by the user, and wherein receiving the at least one measurement associated with the reference device includes:
receiving a frontal width measurement of a frame of the pair of glasses; and
receiving an arm measurement of the frame of the pair of glasses.

7. The computer-implemented method of claim 1, wherein receiving image data captured by the computing device includes receiving image data including front facing images of the head of the user and the reference device, and profile images of the head of the user and the reference device.

8. The computer-implemented method of claim 1, wherein producing the three-dimensional model of the head of the user includes one of:
producing the three-dimensional model of the head of the user by a processor of the computing device; or
transmitting, by the computing device, the image data to an external computing device, and
receiving, by the computing device, the three-dimensional model of the head of the user from the external computing device.

9. The computer-implemented method of claim 1, further comprising detecting a plurality of optical measurements in the image data, the plurality of optical measurements including at least one of pupil height, interpupillary distance, left pupil distance, right pupil distance, vertex distance or pantoscopic angle.

10. The computer-implemented method of claim 1, wherein the application executing on the computing device invokes a self-portrait mode of operation and initiates operation of a forward facing camera of the computing device operated by the user.

11. A non-transitory computer-readable medium storing executable instructions that when executed by at least one processor of a computing device are configured to cause the at least one processor to:
receive, via an application executing on the computing device, image data captured by a camera of the computing device, the image data including image data representing a head of a user and a reference device worn by the user;
receive, via an input into the application, at least one measurement associated with the reference device, including:
receive a first measurement corresponding to a width of a lens portion of a frame of the reference device;
receive a second measurement corresponding to a width of a bridge portion of the frame, wherein a frontal width measurement of the frame is two times the first measurement plus the second measurement; or receive a third measurement corresponding to a length of an arm portion of the frame;

detect the reference device in the image data;

associate a scale with the reference device within the image data based on the at least one measurement;

detect a plurality of features of the head of the user in the image data;

determine a plurality of measurements corresponding to the plurality of features of the head of the user based on the scale associated with the reference device within the image data;

produce a three-dimensional model of the head of the user based on the plurality of measurements of the plurality of features of the head of the user determined based on the scale associated with the reference device; and output a configuration of a head mounted wearable computing device for the user based on the three-dimensional model of the head of the user.

12. The non-transitory computer-readable medium of claim 11, wherein the reference device is a wearable device including at least one known physical feature, and wherein the executable instructions cause the at least one processor to receive the at least one measurement, including:

detect the at least one known physical feature in the image data captured by the computing device; and associate a known measurement with the at least one known physical feature.

13. The non-transitory computer-readable medium of claim 11, wherein the executable instructions cause the at least one processor to detect the reference device in the image data and associate the scale with the reference device within the image data, including:

detect at least one feature of the reference device in the image data;

associate a known measurement with the at least one feature;

compare the known measurement associated with the at least one feature to a detected size within the image data including the at least one feature; and determine a scaling factor based on the comparing.

14. The non-transitory computer-readable medium of claim 13, wherein the executable instructions cause the at least one processor to produce the three-dimensional model, including:

apply the scaling factor to the plurality of features of the head of the user.

15. The non-transitory computer-readable medium of claim 12, wherein the executable instructions cause the at least one processor to:

detect a plurality of optical measurements in the image data, the plurality of optical measurements including at least one of pupil height, interpupillary distance, left pupil distance, right pupil distance, vertex distance or pantoscopic angle.

* * * * *